United States Patent
Morgenstern

(10) Patent No.: US 7,770,545 B2
(45) Date of Patent: Aug. 10, 2010

(54) REFORMED ALCOHOL POWER SYSTEMS

(75) Inventor: David A. Morgenstern, Creve Coeur, MO (US)

(73) Assignee: Monsanto Technology LLC, St. Louis, MO (US)

( * ) Notice: Subject to any disclaimer, the term of this patent is extended or adjusted under 35 U.S.C. 154(b) by 359 days.

(21) Appl. No.: 11/762,623

(22) Filed: Jun. 13, 2007

(65) Prior Publication Data

US 2008/0010993 A1 Jan. 17, 2008

Related U.S. Application Data

(60) Provisional application No. 60/894,635, filed on Mar. 13, 2007, provisional application No. 60/813,220, filed on Jun. 13, 2006.

(51) Int. Cl.
*F02B 43/08* (2006.01)
(52) U.S. Cl. .......................................... 123/3; 123/1 A
(58) Field of Classification Search ................. 123/1 A, 123/3
See application file for complete search history.

(56) References Cited

U.S. PATENT DOCUMENTS

| | | | |
|---|---|---|---|
| 1,975,853 A | 10/1934 | Lazier | |
| 2,892,801 A | 6/1959 | Sargent et al. | |
| 3,254,128 A | 5/1966 | Hagemeyer, Jr. et al. | |
| 3,454,364 A | 7/1969 | Sturm et al. | |
| 3,522,019 A | 7/1970 | Buswell et al. | |
| 3,960,898 A | 6/1976 | Hodge | |
| 4,024,044 A | 5/1977 | Brannan et al. | |
| 4,086,877 A | 5/1978 | Henkel et al. | |
| 4,110,256 A | 8/1978 | Takeuchi et al. | |
| 4,170,200 A | 10/1979 | Takeuchi et al. | |
| 4,175,523 A * | 11/1979 | Noguchi et al. | ................. 123/3 |
| 4,210,103 A * | 7/1980 | Dimitroff et al. | ............ 123/1 A |
| 4,230,072 A * | 10/1980 | Noguchi et al. | ............. 123/1 A |
| 4,238,372 A | 12/1980 | Buss et al. | |
| 4,244,328 A | 1/1981 | Lindstrom | |
| 4,287,365 A | 9/1981 | Becker et al. | |
| 4,340,013 A | 7/1982 | Lindstrom | |
| 4,378,336 A | 3/1983 | Yoon | |

(Continued)

FOREIGN PATENT DOCUMENTS

DE 2713374 C3 9/1978

(Continued)

OTHER PUBLICATIONS

Luengo, C.A., et al., "A Novel Catalyst System for Ethanol Gasification," International Journal of Hydrogen Energy, 1992, pp. 677-681, vol. 17, No. 9.

(Continued)

*Primary Examiner*—Noah Kamen
(74) *Attorney, Agent, or Firm*—Senniger Powers LLP; James E. Davis

(57) ABSTRACT

Improved alcohol reforming processes and reformed alcohol power systems utilizing those processes are disclosed. In preferred embodiments, the alcohol reforming processes utilize a thermally conductive reforming catalyst that allows efficient, low-temperature reforming of an alcohol fuel to produce a reformate gas mixture comprising hydrogen. The present invention makes possible the efficient utilization of alcohol fuels in an internal combustion engine to generate electrical or mechanical power such as in vehicular applications.

3 Claims, 8 Drawing Sheets

U.S. PATENT DOCUMENTS

| | | | |
|---|---|---|---|
| 4,520,764 | A | 6/1985 | Ozawa et al. |
| 4,820,594 | A | 4/1989 | Sugita et al. |
| 5,123,388 | A * | 6/1992 | Kanesaka ............... 123/316 |
| 5,292,936 | A | 3/1994 | Franczyk |
| 5,398,663 | A | 3/1995 | Kulasinghe |
| 5,536,694 | A | 7/1996 | Schuetz et al. |
| 5,611,307 | A | 3/1997 | Watson |
| 5,627,125 | A | 5/1997 | Ebner et al. |
| 5,928,614 | A | 7/1999 | Autenrieth et al. |
| 5,935,277 | A | 8/1999 | Autenrieth et al. |
| 6,077,620 | A | 6/2000 | Pettit |
| 6,126,908 | A | 10/2000 | Clawson et al. |
| 6,155,212 | A | 12/2000 | McAlister |
| 6,209,494 | B1 | 4/2001 | Manikowski, Jr. et al. |
| 6,284,703 | B1 | 9/2001 | Ostgard et al. |
| 6,309,758 | B1 | 10/2001 | Schmidt |
| 6,376,708 | B1 | 4/2002 | Morgenstern et al. |
| 6,432,871 | B1 | 8/2002 | Bachinger et al. |
| 6,502,533 | B1 | 1/2003 | Meacham |
| 6,541,142 | B1 | 4/2003 | Yu et al. |
| 6,541,663 | B2 | 4/2003 | Siebenhaar et al. |
| 6,573,213 | B1 | 6/2003 | Ostgard et al. |
| 6,575,856 | B2 | 6/2003 | Anderson |
| 6,646,160 | B2 | 11/2003 | Franczyk, II et al. |
| 6,668,763 | B2 | 12/2003 | Anderson et al. |
| 6,686,075 | B2 | 2/2004 | Gieshoff et al. |
| 6,732,942 | B1 | 5/2004 | Sangwan et al. |
| 6,794,331 | B2 | 9/2004 | Ostgard et al. |
| 6,818,720 | B2 | 11/2004 | Krauter et al. |
| 6,903,256 | B2 | 6/2005 | Pittman et al. |
| 6,903,259 | B2 | 6/2005 | Ciray et al. |
| 6,915,776 | B2 | 7/2005 | Zur Loye et al. |
| 6,955,620 | B2 | 10/2005 | Anderson |
| 2001/0018402 | A1 | 8/2001 | Ostgard et al. |
| 2002/0019564 | A1 | 2/2002 | Morgenstern et al. |
| 2002/0099246 | A1 | 7/2002 | Siebenhaar et al. |
| 2003/0121481 | A1 | 7/2003 | Dodd et al. |
| 2003/0200939 | A1* | 10/2003 | Hiltner et al. ............... 123/3 |
| 2004/0133045 | A1 | 7/2004 | Okanobori et al. |
| 2004/0137288 | A1 | 7/2004 | Morgenstern |
| 2004/0199019 | A1 | 10/2004 | Schmidt |
| 2004/0260120 | A1 | 12/2004 | Ostgard et al. |
| 2005/0048345 | A1 | 3/2005 | Meacham |
| 2005/0049434 | A1 | 3/2005 | Tustin et al. |
| 2007/0084651 | A1 | 4/2007 | Dong |

FOREIGN PATENT DOCUMENTS

| | | |
|---|---|---|
| DE | 19534433 C1 | 10/1996 |
| EP | 0648534 A1 | 4/1995 |
| EP | 0734765 A1 | 2/1996 |
| EP | 0920064 A1 | 6/1999 |
| EP | 1125633 A2 | 8/2001 |
| EP | 1662113 A2 | 5/2006 |
| EP | 1691065 A1 | 8/2006 |
| FR | 2795339 A1 | 12/2000 |
| GB | 2046779 | 11/1980 |
| JP | 63256136 | 10/1988 |
| WO | 9527845 A1 | 10/1995 |
| WO | 0032310 A1 | 6/2000 |
| WO | 0100320 A1 | 1/2001 |
| WO | 2004035466 A1 | 4/2004 |
| WO | 2004091777 A2 | 10/2004 |

OTHER PUBLICATIONS

Lyu, S.C., et al., "Synthesis and Characterization of High-Quality Double-Walled Carbon Nanotubes by Catalytic Decomposition of Alcohol," Chem. Commun., 2003, pp. 1404-1405.

Malakoff, D., "U.S. Supercars: Around the Corner, or Running on Empty?," Science Magazine, Jul. 30, 1999, pp. 680-685, vol. 285.

Mariño, F., et al., "Steam Reforming of Ethanol Using Cu-Ni Supported Catalysts," Studies in Surface Science and Catalysis, 2000, pp. 2147-2152, vol. 130.

Mariño, F., et al., "Hydrogen Production from Steam Reforming of Bioethanol Using Cu/Ni/K/γ-Al2O3 Catalysts. Effect of Ni," International Journal of Hydrogen Energy, 2001, pp. 665-668, vol. 26.

Martin, M.D., "Gaseous Automotive Fuels from Steam Reformed Liquid Hydrocarbons," SAE Paper 780457, 1978, pp. 1-7.

Matsumura, Y., et al., "Catalytic Methanol Decomposition to Carbon Monoxide and Hydrogen Over Nickel Supported on Silica," Journal of Molecular Catalysis A: Chemical, Mar. 2000, pp. 157-165, vol. 152, Issues 1-2.

Matthews, R.D., "Internal Combusion Engines," Chapter 59, Mechanical Engineers' Handbook, 2nd Ed, 1998, John Wiley & Sons, Inc., pp. 1801-1822.

Mattos, L.V., et al., "Partial Oxidation of Ethanol on Supported Pt Catalysts," Journal of Power Sources, 2005, pp. 10-15, vol. 145.

Morgenstern D.A., et al., "Low-Temperature Reforming of Ethanol Over Copper-Plated Raney Nickel: A New Route to Sustainable Hydrogen for Transportation," Energy & Fuels, 2005, vol. 19.

Morgenstern D.A., "Low Temperature Reforming of Ethanol to Hydrogen and Methane over Copper-Plated Nickel Sponge: A "Duel Fuel" Approach to Fuel Cell Vehicle Powertrains," Presented at American Chemical Society Meeting & Exposition, Mar. 26-30, 2006.

Morita, M., et al., Abstract of "Catalytic Activities of Platinum and Nickel Doped Magnesium Oxide for Steam Reforming of Ethanol," Fac. Eng., 1993.

Murcia-Mascarós, S., et al., "Oxidative Methanol Reforming Reactions on CuZnAl Catalysts Derived from Hydrotalcite-like Precursors," Journal of Catalysis, 2001, pp. 338-347, vol. 198.

Orchard, J.P., et al., "Preparation and Properties of Raney Nickel-Cobalt Catalysts," Journal of Catalysis, 1983, pp. 189-199, vol. 84.

Pettersson L., et al., "An Experimental and Theoretical Evaluation of the Onboard Decomposed Methanol Spark-Ignition Engine," Combust. Sci. and Tech., 1990, pp. 129-143, vol. 71.

Pettersson, L.J., "State of the Art of Multi-Fuel Reformers for Fuel Cell Vehicles: Problem Identification and Research Needs," International Journal of Hydrogen Energy, 2001, pp. 243-264, vol. 26.

Reitz, T.L., et al., "Methanol Reforming Over CuO/ZnO Under Oxidizing Conditions," Studies in Surface Science and Catalysis, 2000, pp. 3645-3650, vol. 130.

Reitz, T.L., et al., "Time-Resolved XANES Investigation of CuO/ZnO in the Oxidative Methanol Reforming Reaction," Journal of Catalysis, 2001, pp. 193-201, vol. 199.

Ridler, D.E., et al., "Catalyst Handbook," 2nd ed., M.V. Twigg ed. Manson Publishing, London, 1996, pp. 225-282.

Sakai, T., et al., "Transient Performance Development on Dissociated Methanol Fueled Passenger Car," SAE Paper 871169, 1987, pp. 169.1-169.10.

Sato, T., et al., "A Study on the Reformed-Methanol Engine," SAE Paper 861237, 1986, pp. 1-9.

Schmidt, S.R., "Surfaces of Raney® Catalysts," Catalysis of Organic Reactions, 1995, Marcel Pekker Inc., New York, pp. 45-59.

Schoubye, P., "Methanation of CO on Some Ni Catalysts," Journal of Catalysis, 1969, pp. 238-246, vol. 14.

Sheng, P.-Y. et al., "H2 Production from Ethanol over Rh-Pt/CeO2 Catalysts: The Role of Rh for the Efficient Dissociation of the Carbon-Carbon Bond," Journal of Catalysis, 2002, pp. 393-403, vol. 208.

Shudo, T., et al., "Influence of Hydrogen and Carbon Monoxide on HCCI Combustion of Dimethyl Ether," SAE Paper 2002-01-2828, 2002, pp. 1-10.

Shudo, T., et al., "Ignition Control by DME-Reformed Gas in HCCI Combustion of DME," SAE Paper 2003-01-1824, 2003, pp. 1-8.

Shudo, T., et al., "Influence of Reformed Gas Composition on HCCI Combustion of Onboard Methanol-Reformed Gases," SAE Paper 2004-01-1908, 2004, pp. 1-7.

Shudo, T., "An HCCI Combustion Engine System Using On-board Reformed Gases of Methanol With Waste Heat Recovery: Ignition Control by Hydrogen," International Journal of Vehicle Design, 2006, (abstract).

Sillitto, S.M.A., et al., "Electrochemical Testing and Structural Characterization of Nickel-based Catalytic Coatings Produced by Direct Spraying," Materials Research Society Symposium Proceedings, 1999, pp. 23-29.

Silva, N. R., et al., "Using Additive to Improve Cold Start in Ethanol-Fuelled Vehicles," SAE Paper 2000-01-1217, 2000, pp. 1-5.

Tromp, T.K., et al., "Potential Environmental Impact of a Hydrogen Economy on the Stratosphere," Science, Jun. 13, 2003, pp. 1740-1742, vol. 300.

Tsolakis, A., et al., "Application of Exhaust Gas Fuel Reforming in Compression Ignition Engines Fueled by Diesel and Biodiesel Fuel Mixtures," Energy & Fuels, 2003, pp. 1464-1473, vol. 17.

Tsolakis, A., et al., "Catalytic Exhaust Gas Fuel Reforming for Diesel Engines—Effects of Water Addition on Hydrogen Production and Fuel Conversion Efficiency," International Journal of Hydrogen Energy, 2004, pp. 1409-1419, vol. 29.

Tsolakis, A., et al., "Exhaust Gas Assisted Reforming of Rapeseed Methyl Ester for Reduced Exhaust Emissions of CI Engines," Biomass and Bioenergy, 2004, pp. 493-505, vol. 27.

Tsolakis, A., et al., "Low Temperature Exhaust Gas Fuel Reforming of Diesel Fuel," Fuel, 2004, pp. 1837-1845, vol. 83.

Tu, Y.-J., et al., Abstract of "Effect of Chromium Promoter on Copper Catalysts in Ethanol Dehydrogenation," Journal of Chemical Technology and Biotechnology, 1994, vol. 59, Issue 2.

Tullo, A. H., "A Fuel Cell in Every Car," Chemical & Engineering News, Mar. 5, 2001, pp. 19-22.

Tully, E.J., et al., "Lean-Burn Characteristics of a Gasoline Engine Enriched with Hydrogen From a Plasmatron Fuel Reformer," SAE Paper 2003-01-0630, 2003.

Velu, S., et al., "Selective Production of Hydrogen for Fuel Cells Via Oxidative Steam Reforming of Methanol Over CuZnAl(Zr)-oxide Catalysts," Applied Catalysis A: General, May 14, 2001, pp. 47-63, vol. 213, Issue 1.

Vernon, D., "Hydrogen Enrichment Via Chemical Recuperation to Increase Efficiency and Reduce Emissions in Engines," Research Proposal 2005—GATE.

Voecks, G.E., et al., "Operation of a Catalytic Methanol Decomposition Reactor for Vehicular Use," Proceedings of the International Symposium on Alcohol Fuels Technology, 1980, pp. 275-283, Brasil.

Wainwright, M.S., et al., "Raney Nickel-Copper Catalysts II. Surface and Pore Structures," Journal of Catalysis, 1980, pp. 124-131, vol. 64.

Wakai, K., et al., "Effect of Small Hydrogen Jet Flame on Augmentation of Lean Combustion," SAE Paper 931943, 1993.

Watson, H., et al., "A Hybrid Combustion System for High Efficiency with No NOx," World Automotive Congress, 2004.

Yamaguchi, I., et al., "Development Research on Dissociated Methanol Fueled Spark Ignition Engine," SAE Paper 852201, 1985, pp. 193-205.

Yap, D., et al., "Effect of Hydrogen Addition on Natural Gas HCCI Combustion," SAE Paper 2004-01-1972, 2004.

Yee, A., et al., "A Study of the Reactions of Ethanol on CeO2 and Pd/CeO2 by Steady State Reactions, Temperature Programmed Desorpotion, and In Situ FT-IR," Journal of Catalysis, 1999, pp. 279-295, vol. 186.

Yoo, Se Jong, et al., "Feasibility Evaluation of Reformed Methanol Usage to Spark Ignition Engine," SAE Paper 871166, 1987, pp. 166.1-166.7

Young, D.J., et al., "Raney Nickel-Copper Catalysts I. Structure and Leaching Properties," Journal of Catalysis, 1980, pp. 116-123, vol. 64.

Wainwright, "Raney Copper and Raney Copper-Zinc Catalyst," Chem. Ind., 1996, pp. 213-230, vol. 68.

Choi, et al., "Fuel Cell Grade Hydrogen From Methanol On a Commercial Cu/ZnO/Al2O3 Catalyst," Applied Catalysis B: Environmental, 2002, pp. 259-269, vol. 38.

De Wild, et al., "Catalytic Production of Hydrogen From Methanol," Catalysis Today, 2000, pp. 3-10, vol. 60.

Emonts, et al., "Fuel Cell Drive System with Hydrogen Generation in Test," Journal of Power Sources, 2000, pp. 228-236, vol. 86.

"BASF Catalyst for Daimler-Benz Car," European Chemical News, May 1998, p. 22.

EPRI Journal, May/Jun. 1997, pp. 8-17.

Young, D.J., "The Water-Gas Shift Reaction," Catalyst Handbook, 2nd Edition, 1996, pp. 283-339.

Marino, F., et al., "Hydrogen From Steam Reforming of Ethanol Characterization and Performance of Copper-Nickel Supported Catalysts," Int. J. Hydrogen Energy,1998, pp. 1095-1101, vol. 23, No. 12.

Adams, Tim, "A Comparison of Engine Performance Using Methanol Or Dissociated Methanol as the Fuel," SAE Paper 845128, 1984, pp. 4.151-4.157.

Agrell, Johan, et al., "Catalytic Hydrogen Generation From Methanol," Catalysis, 2002, pp. 67-132, vol. 16.

Alejo, L., et al., "Partial Oxidation of Methanol to Produce Hydrogen Over Cu-Zn-based Catalysts," Applied Catalysis A: General, 1997, pp. 281-297, vol. 162.

Amphlett, J.C., et al., "A Deactivation Model for Methanol-Steam Reformation on Cu/ZnO/Al2O3 Catalyst for Optimizing the Production of Fuel-Cell Hydrogen," Studies in Surface Science and Catalysis, 2001, pp. 205-212, vol. 139.

Amphlett, J.C., et al., "On Board Hydrogen Purification for Steam Reformation/PEM Fuel Cell Vehicle Power Plants," Int. J. for Hydrogen Energy, 1996, pp. 673-678, vol. 21, No. 8.

Appleby, A.J., "The Electrochemical Engine for Vehicles: Fuel Cells Can Power Cleaner Buses and Cars, But Key Engineering and Economic Obstacles Will Delay Widespread Adoption of the Technology," Scientific American, Jul. 1999, pp. 74-79.

Augustine, R.L., Catalytic Hydrogenation: Techniques and Applications in Organic Sythesis, 1965, pp. 147-149.

Bauer, C.G., et al., "Effect of Hydrogen Addition on the Performance of Methane-Fueled Vehicles. Part I: Effect on S.I. Engine Performance," International Journal of Hydrogen Energy, 2001, pp. 55-70, vol. 26.

Black F., "An Overview of the Technical Implications of Methanol and Ethanol as Highway Motor Vehicle Fuels," SAE Paper 912413, Oct. 1991, pp. 1-30.

Bowers B.J., et al., "Performance of an Onboard Fuel Processor for PEM Fuel Cell Vehicles," SAE Paper 2005-01-0008, 2005, pp. 41-46.

Breen J.P, et al., "Mechanistic Aspects of the Steam Reforming of Methanol Over a CuO/ZnO/ZeO2/Al2O3 Catalyst," Chem. Commun., 1999, pp. 2247-2248.

Bridgewater, A.J., et al., "Methanol Synthesis Over Raney Copper-Zinc Catalysts. III. Optimization of Alloy Composition and Catalyst Preparation," Applied Catalysis, 1983, pp. 369-382, vol. 7.

Cairns, J.F., et al., "Advances in ICI's Activated Cathode Technology for Chlor-Alkali Production," Electrochemical Society Proceedings, 1998, pp. 289-296, vol. 98-10.

Cavallaro, S., et al., "Hydrogen Produced from Ethanol for Internal Reforming Molten Carbonate Fuel Cell," Journal of Power Sources, 2001, pp. 198-204, vol. 102.

Cheng, W., "Reaction and XRD Studies on Cu Based Methanol Decomposition Catalysts: Role of Constituents and Development of High-Activity Multicomponent Catalysts," Applied Catalysis A: General, 1995, pp. 13-30, vol. 130.

Cheng, W., "Development of Methanol Decomposition Catalysts for Production of H2 and CO," Accounts of Chemical Research, 1999, pp. 685-691, vol. 32, No. 8.

Cracknell, R.F., et al., "Designing Fuels Compatible with Reformers and Internal Combustion Engines," SAE Paper 2004-01-1926, 2004.

Das, L.M., "Hydrogen Engines: A View of the Past and A Look Into the Future," International Journal of Hydrogen Energy, 1990, pp. 425-443, vol. 15, No. 6.

Date, T., et al., "Research and Development of the Honda CVCC Engine," SAE Paper 740605, 1974.

Davis G.W., et al., "Ethanol Vehicle Cold Start Improvement When Using a Hydrogen Supplemented E85 Fuel," Proc. Intersoc. Energy Con., 2000, pp. 303-308, vol. 1, No. 35.

Fatsikostas, A.N., et al., "Steam Reforming of Biomass-Derived Ethanol for the Production of Hydrogen for Fuel Cell Applications," Chemcomm Communication, 2001.

Fierro, I., "Oxidative Reforming of Biomass Derived Ethanol for Hydrogen Production in Fuel Cell Applications," Catalysis Today, 2002, pp. 141-144, vol. 75.

Finegold, J.G., et al., "Reformed Methanol," Solar Energy Research Institute, 1982, pp. 1-13.

Freni, S., et al., "Hydrogen Production by Steam Reforming of Ethanol: A Two Step Process," React. Kinet. Catal. Lett., 2000, pp. 143-152, vol. 71, No. 1.

Gates, S.M., et al., "Bond Activation Sequence Observed in the Chemisorption and Surface Reaction of Ethanol on Ni(111)", Surface Science, 1986, pp. 111-134, vol. 171.

Gersten, J. I., et al., "Thermal Conductivity," The Physics and Chemistry of Material, 2001, p. 144, Wiley & Sons, New York City, New York.

Gray P., et al., "An Introduction to Fuel Processing and Some Advances in Fuel Processor Catalysts," 2004, pp. 61-73, R. Thring Ed. Wiley, New York.

Greiner, L., et al., "Engine Cold-Start with Dissociated Methanol", Proc. Int. Symp. Alcohol Fuels Technol., Issue CONF-790520, Paper III-50, 1979, NTIS, Springfield, Virginia.

Günter, M.M., et al., "Redox Behavior of Copper Oxide/Zinc Oxide Catalysts in the Steam Reforming of Methanol Studied by in situ X-Ray Diffraction and Absorption Spectroscopy," Journal of Catalysis, 2001, pp. 133-149, vol. 203, No. 1.

Haga, F., et al., "Catalytic Properties of Supported Cobalt Catalysts for Steam Reforming of Ethanol", Catalysis Letters, 1997, pp. 223-227, vol. 48.

Haga, F., et al., English Abstract of "Catalytic Properties of Supported Transition Metal Catalysts for Conversion of Ethanol in the Presence of Water Vapor," Nippon Kagaku Kaishi, 1997, pp. 33-36 (abstract).

Haselgrove, P., et al., "Manufacture of Raney® Type Catalysts via Spray Deposition," cfi/Ber. DKG, 2005, pp. E1-E3, vol. 82, No. 11.

Heck, R.M., et al., "Auto Exhaust Catalysis," Encyclopedia of Catalysis, 2003, pp. 517-560, vol. 1.

Heywood, J.B., "Combustion in Spark-Ignition Engines," Internal Combustion Engine Fundamentals, 1988, pp. 447-450.

Hirota, T., "Study of the Methanol-Reformed Gas Engine," JSAE Review, Mar. 1981, pp. 7-13.

Hofeldt, D.L., "Alternative Fuel Technologies for Heavy Duty Vehicles: Performance, Emissions, Economics, Safety, and Development Status," SAE Paper 930731, 1993, pp. 1-22.

Huss, C., English Abstract of "Future Propulsion Systems and Fuels," Atomwirtschaft-Atomtechnik, Dec. 2002, pp. 760-766, vol. 47, No. 12, Federal Republic of Germany (Abstract).

Idriss, H., et al., "Reactions of Acetaldehyde on $CeO_2$ and $CeO_2$-Supported Catalysts," Journal of Catalysis, 1995, pp. 219-237, vol. 155.

Idriss, H., et al., "Reactions of Ethanol Over Metal Oxides," Journal of Molecular Catalysis A: Chemical, Mar. 2000, pp. 201-212, vol. 152, Issues 1-2.

Inagaki, T., et al., "Combustion and Emission of Gaseous Fuel From Reformed Methanol in Automotive Engine," Proc. Int. Symp. Alcohol Fuels Technology, 1980, pp. 1-12.

Ivanič, Ž., "Effects of Hydrogen Enhancement on Efficiency and NOx Emissions of Lean and EGR-Diluted Mixtures in a SI Engine," SAE Paper 2005-01-0253, 2005.

Iwasa, N., et al., "Reforming of Ethanol-Dehydrogenation to Ethyl Acetate and Steam Reforming to Acetic Acid Over Copper-Based Catalysts," Bull. Chem. Soc. Jpn., 1991, pp. 2619-2623, vol. 64, The Chemical Society of Japan.

Jamal, Y., et al., "Onboard Generation of Hydrogen-Rich Gaseous Fuels—A Review," International Journal of Hydrogen Energy, 1994, pp. 557-572, vol. 19, No. 7.

Jiang, C.J., et al., "Kinetic Mechanism for the Reaction Between Methanol and Water Over a $Cu-ZnO-Al_2O_3$ Catalyst", Applied Catalysis A: General, 1993, pp. 145-158, vol. 97.

Keller, J., et al., "Hydrogen Fueled Engines in Hybrid Vehicles," SAE Paper 2000-10-0546, 2001, pp. 117-122.

Klouz, V., et al., "Ethanol Reforming for Hydrogen Production in a Hybrid Electric Vehicle: Process Optimisation," Journal of Power Sources, 2002, pp. 26-34, vol. 105.

König, A., et al., "Engine Operation on Partially Dissociated Methanol," SAE Paper 850573, 1985, pp. 1-9.

Ku, J., et al., "Conversion of a 1999 Silverado to Dedicated E85 with Emphasis on Cold Start and Cold Driveability," SAE Paper 2000-01-0590, 2000, pp. 1-16.

Lieber, E., et al., "The Uses of Raney Nickel," Advanced in Catalysis, vol. V, Academic Press, New York, 1953 pp. 417-455.

* cited by examiner

REFORMED ALCOHOL POWER SYSTEMS

CROSS-REFERENCE TO RELATED APPLICATIONS

This application claims priority to U.S. Provisional Application No. 60/894,635, filed Mar. 13, 2007 and U.S. Provisional Application No. 60/813,220, filed Jun. 13, 2006, the entire disclosures of which are incorporated herein.

BACKGROUND OF THE INVENTION

This application claims priority to U.S. Provisional Application No. 60/894,635, filed Mar. 13, 2007 and U.S. Provisional Application No. 60/813,220, filed Jun. 13, 2007, the entire disclosures of which are incorporated herein.

This invention is generally related to power systems utilizing alcohol reforming, and more particularly, to the efficient reforming of alcohols to produce hydrogen-containing gas mixtures to use as fuel in internal combustion engines such as those used to generate electrical or mechanical power in vehicular power systems.

In transportation applications, alcohols, particularly ethanol, are garnering increased interest as an alternative to fossil fuels for internal combustion engines. Ethanol is a renewable fuel, typically derived from fermentation of agricultural biomass. Unlike fossil fuels, the carbon dioxide liberated during the combustion of ethanol does not represent an increase in greenhouse gases because the carbon atoms released during combustion represent atmospheric carbon dioxide fixed by plants from which the ethanol is derived.

However, there are difficulties associated with the use of alcohol fuels in internal combustion engines. The lower heating values of methanol (15.9 MJ/liter) and ethanol (21.3 MJ/L) are substantially less than that of conventional gasoline (32 MJ/liter) as reported by F. Black in "An Overview of the Technical Implications of Methanol and Ethanol as Highway Vehicle Fuels," SAE Paper 912413, 1991. Thus, a greater volume of alcohol fuel is necessary if utilized with equal efficiency, which reduces the value of ethanol to the consumer on a volumetric basis.

Moreover, cold start is a problem for alcohol-fueled engines because at low temperature the fuel lacks sufficient vapor pressure to form an ignitable mixture. Anhydrous ethanol engines cannot start at ambient temperatures below about 15° C. (59° F.). Ethanol, therefore, is usually blended with gasoline in the United States (typically, 15% gasoline in E85 blend), so that the gasoline can initiate combustion in cold temperature operating environments. E85 engines can achieve cold start at low temperatures by massive overfueling in order to force enough volatile fuel into the cylinder to achieve ignition. This results in high levels of hydrocarbon and carbon monoxide emissions, a problem which is significantly aggravated by the fact that the catalytic converter is not yet at operating temperature. (See J. Ku et. al., "Conversion of a 1999 Silverado to Dedicated E85 With Emphasis on Cold Start and Cold Driveability", SAE 2000-01-0590, 2000). Moreover, cold start problems may persist even using E85 and similar fuel blends at lower temperatures. As a solution to the cold start-up problem, G. W. Davis et al. suggest in *Proc. Intersoc. Energy Conver. Eng. Con.*, 2000, 35, pp. 303-8 to supplement the E85/air mixture with hydrogen.

The two most important variables determining the efficiency of an internal combustion engine are the expansion ratio and the air:fuel ratio. The expansion ratio is the ratio of the volume in the cylinder at the time the exhaust valve opens to the volume at maximum compression. The expansion ratio is often, but not always, equivalent to the compression ratio. An engine's compression ratio is the ratio of the volume between the piston and cylinder head before and after the compression stroke. The air:fuel ratio is sometimes expressed as $\lambda$ and sometimes as the equivalence ratio, denoted by $\phi$. Lambda ($\lambda$) is calculated by dividing the actual air:fuel ratio by the stoichiometric ratio of air:fuel for the fuel being combusted. The equivalence ratio is calculated by dividing the actual fuel:air ratio by the stoichiometric fuel:air ratio for the fuel being combusted.

*Internal Combustion Engine Fundamentals* by John B. Heywood (McGraw Hill, New York, 1988) describes the effect of expansion ratio and equivalence ratio on internal combustion engine efficiency. Increasing an engine's expansion ratio improves efficiency as does increasing $\lambda$. Increasing $\lambda$ above 1.0 corresponds to using "leaner" fuel-air mixtures (i.e., mixtures with an excess of air over that required by stoichiometry).

The maximum attainable compression ratio is set by the knock limit. Increasing compression leads to increased temperature and pressure of the gas in the cylinder that causes spontaneous, premature ignition known as "knock." The ability of a fuel to resist knock is quantified by its octane number. Both methanol and ethanol are relatively high octane fuels, but methane, hydrogen, and carbon monoxide are more resistant to knock and therefore can be utilized with high efficiency in an internal combustion engine operated with a high compression or expansion ratio.

Lean combustion improves fuel efficiency in part because it ensures complete combustion of the fuel, but primarily by reducing the temperature of the combusted gas. The lower temperature reduces heat loss to the cylinder walls and improves the thermodynamic efficiency with which the gas does work on the piston. For example, J. Keller et al. report in *SAE Special Publication* 1574, 2001, pp. 117-22 that operating a four-stroke, spark-ignited internal combustion engine using hydrogen as a fuel under lean conditions (equivalence ratio=0.35-0.45, corresponding $\lambda$=2.2-2.9) and high compression ratio (up to 20) results in thermal efficiencies of up to 47%. A further advantage of low temperature combustion is the fact that formation of nitrogen oxides ($NO_x$) is minimized.

When the air:fuel ratio becomes too lean (and the gas temperature too cool) the mixture will fail to ignite or "misfire." Alternatively, the mixture may burn too slowly or incompletely. Because hydrogen will burn in air at concentrations down to about 4% and exhibits a high flame velocity, aiding rapid and complete combustion, supplementation of the fuel with hydrogen allows for reliable operation under lean conditions. As reported by C. G. Bauer et al. in *Int. J. Hydrogen Energy*, 2001, 26, 55-70, the burning speeds of hydrogen, methane, and gasoline in air at normal temperature and pressure (NTP) are 264-325, 37-45 and 37-43 cm/sec, respectively.

Reforming alcohols is an alternative to combusting alcohol fuels directly in an internal combustion engine. In a reforming process, the alcohol is decomposed into permanent gases that can be fed to an internal combustion engine. L. Pettersson reports in *Combust. Sci. and Tech.*, 1990, pp. 129-143, that operating an internal combustion engine on reformed methanol rather than liquid methanol can improve efficiency. The key factors responsible for the improved efficiency are the high air:fuel ratio, the increase in the heat of combustion of reformed alcohols compared to non-reformed alcohols, and the ability to use higher compression ratios.

It is known that starting an internal combustion engine on a mixture of permanent gases produced by methanol reforming is easier than starting on liquid methanol fuel when the ambient temperature is low. For example, L. Greiner et al. report in *Proceedings of the International Symposium on Alcohol Fuels Technology*, 1981, paper III-50, CAS no. 1981: 465116, that ignition and continuous run at −25° C. can be achieved by reforming methanol using heat from electric current provided by a battery. However, the battery quickly discharges, forcing an early and difficult transition to the use of liquid methanol fuel and eliminating any energy efficiency advantage associated with the use of reformed methanol as a fuel.

In U.S. Pat. No. 4,520,764, issued to M. Ozawa et al. and in *JSAE Review*, 1981, 4, 7-13, authored by T. Hirota, the use of reformed methanol to fuel an internal combustion engine at startup and during steady-state operation is reported. Engine exhaust is used to heat the methanol reformer. Using lean combustion ($\lambda$=1.7) and a high compression ratio (14), they achieved an excellent brake thermal efficiency of 42%. By comparison, the maximum value for non-reformed methanol is about 33%. Ozawa et al. report that the engine can be started on reformate (hydrogen and CO) stored in a pressure vessel.

Reformed methanol power systems tend to backfire severely if the fuel-air mixture is not lean enough because of the high hydrogen composition. L. M. Das in *Int. J. Hydrogen Energy*, 1990, 15, 425-43, reports that when the fuel-air mixture is not lean enough, severe backfiring is a problem for engines running on hydrogen. T. G. Adams in *SAE Paper* 845128, 1984, 4.151-4.157 reports that CO—H$_2$ mixtures from methanol reforming backfire at high concentration. As a result, the rate at which fuel can be fed to the engine and the engine's maximum power are limited.

Vehicular power systems including a fuel cell fed with hydrogen to produce electrical power have also been suggested. The fuel cell vehicle may be equipped with pressurized tanks of stored hydrogen or with a fuel processor capable of converting an alcohol or other liquid hydrocarbon fuel to hydrogen. Onboard reforming of liquid fuels would enable fuel cell vehicles to achieve ranges comparable to gasoline-fueled automobiles.

Onboard reforming of liquid or gaseous fuels to yield hydrogen-containing gas mixtures can be conceptually divided into two categories depending on the temperature required. It is both thermodynamically and kinetically feasible to reform methanol to hydrogen and carbon monoxide or carbon dioxide with greater than 95% conversion at temperatures of about 300° C. A review of methanol reforming can be found in the article "Hydrogen Generation from Methanol" by J. Agrell, B. Lindström, L. J. Pettersson and S. G. Järås in *Catalysis-Specialist Periodical Reports*, 16, Royal Society of Chemistry, Cambridge, 2002, pp. 67-132. Morgenstern et al. describe complete conversion of ethanol to methane, hydrogen and CO/CO$_2$ below about 300° C. See U.S. Patent Application Pub. No. 2004/0137288 A1; and "Low Temperature Reforming of Ethanol over Copper-Plated Raney Nickel: A New Route to Sustainable Hydrogen for Transportation," *Energy and Fuels*, Vol. 19, No. 4, pp. 1708-1716 (2005). Although other fuels that reform around 300° C. are known, such as glycerol, none are abundant enough to serve as motor fuels.

Most other reforming processes are highly endothermic and therefore require temperatures of about 700° C. because of the stability of carbon-hydrogen bonds in the molecule. Reforming of methane and gasoline as well as high temperature reforming of ethanol to hydrogen and carbon monoxide are in this category. Although considerable research has been devoted to onboard generation of hydrogen via high temperature reforming, fueling an internal combustion engine is not practical at high reforming temperature, largely because of the energy cost of generating the required heat by burning a portion of the fuel.

By contrast, fueling an internal combustion engine with reformed methanol is known in the art and is enabled by the fact that the reformer can be maintained at the required temperature (typically about 300° C.) by the heat of the engine exhaust. Even so, high thermal conductivity is required in the catalyst and reformer to effectively use engine exhaust as a heat source. Hirota reports in *JSAE Review*, 1981, 4, 7-13, that, although methanol reforming requires a temperature of only 300° C., considering the performance of the current reformer's heat exchanger, a temperature difference of about 100° C. between the exhaust and catalyst is required, so that the lower limit of the exhaust temperature is approximately 400° C. This limit corresponds to an engine speed of about 1400 rpm under no load. Thus, there are difficulties in the prior art in maintaining reformer temperature (and thus catalyst activity) when the engine is near idle.

Numerous papers have also described the high-temperature steam reforming of ethanol to carbon monoxide and hydrogen using alumina-supported, copper-nickel catalysts in accordance with reaction equation (1) below. In fuel cell power systems, it would be necessary to contact the reformate with a suitable low-temperature water-gas shift catalyst in accordance with reaction equation (2) to generate further hydrogen and eliminate CO, a fuel cell poison.

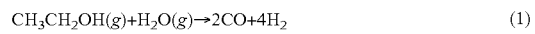

$$CH_3CH_2OH(g)+H_2O(g)\rightarrow 2CO+4H_2 \tag{1}$$

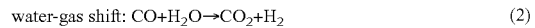

$$\text{water-gas shift: } CO+H_2O\rightarrow CO_2+H_2 \tag{2}$$

Reaction (1) is highly endothermic, which accounts for the requirement of reforming temperatures of about 700° C. in order to fully convert ethanol to hydrogen. The high temperature required for the reaction causes several difficulties when attempting to utilize ethanol reformed in this way for the generation of electrical or mechanical power. First, as noted above, engine exhaust is not hot enough to supply the heat required in the reformer. Accordingly, exhaust-heated, high-temperature reforming of ethanol for vehicular power system applications has not been widely developed or tested. Second, catalyst deactivation during high-temperature ethanol reforming has been reported as severe. The major cause of deactivation is coking due to the formation of polyethylene on the catalyst surface, which is converted to graphite. The dehydration of ethanol to ethylene, catalyzed by acidic sites on the support, is believed to be the root cause of catalyst deactivation. (See Freni, S.; Mondello, N.; Cavallaro, S.; Cacciola, G.; Parmon, V. N.; Sobyanin, V. A. *React. Kinet. Catal. Lett.* 2000, 71, 143-52.) High levels of ethylene formation have been reported on alumina-supported catalysts (See Haga, F.; Nakajima, T.; Yamashita, K.; Mishima, S.; Suzuki, S. *Nippon Kagaku Kaishi*, 1997, 33-6.)

Morgenstern et al. have explored fuel cell vehicular power systems fed with hydrogen produced by the low-temperature (e.g., below about 400° C.) reforming of alcohol, particularly ethanol, over a catalyst comprising copper at the surface of a metal supporting structure (e.g., copper-plated Raney nickel). Morgenstern et al. propose that low-temperature ethanol reforming may be divided into two steps, although a concerted mechanism is also possible. In accordance with reaction equations (3)-(5), ethanol is first reversibly dehydrogenated to acetaldehyde, followed by decarbonylation of acetaldehyde to form carbon monoxide and methane. After water-gas shift, 2 moles of hydrogen are produced per mole of ethanol.

$$CH_3CH_2OH(g)\rightarrow CH_3CHO(g)+H_2 \quad \Delta H=+68.1 \text{ kJ/mol} \tag{3}$$

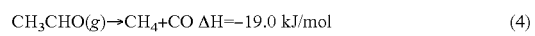

$$CH_3CHO(g)\rightarrow CH_4+CO \quad \Delta H=-19.0 \text{ kJ/mol} \tag{4}$$

net after water-gas shift:

$$CH_3CH_2OH + H_2O \rightarrow CH_4 + CO_2 + 2H_2 \quad (5)$$

As compared to conventional high-temperature reforming of ethanol, which produces 6 moles of hydrogen per mole of ethanol after water-gas shift (reaction equations (1) and (2)), an apparent drawback of the low-temperature reforming pathway is its low hydrogen yield, producing two moles of hydrogen per mole of ethanol after water-gas shift. However, Morgenstern et al. teach that onboard a fuel cell vehicle, the methane in the reformate would pass through the fuel cell unit without degrading its performance and the fuel cell effluent may be fed to a downstream internal combustion engine to capture the fuel value of the methane (along with any residual hydrogen, ethanol and acetaldehyde). Waste heat from the engine exhaust is used to heat the reformer and drive the endothermic dehydrogenation of ethanol.

Despite the advantages provided in the teaching of Morgenstern et al. and others, the commercial development of vehicular fuel cell power systems is impeded by the complexity and high cost of the fuel cell unit as well as cold start and transient response issues. Storage of hydrogen onboard the vehicle creates safety concerns and imposes weight and cost penalties associated with the high pressure storage tanks, as well as a loss of energy efficiency caused by the necessity of compressing the hydrogen to pressures of 5-10,000 psi.

Accordingly, a need persists for reformed alcohol power systems in vehicular and other applications that use an internal combustion engine for primary power generation and effectively exploit the fuel value of alcohols with high efficiency to enable cold start-up without blending conventional gasoline and allow for leaner air:fuel operation of the internal combustion engine.

SUMMARY OF THE INVENTION

The present invention is directed to processes for producing mechanical or electrical power from a fuel comprising alcohol. In one embodiment, the process comprises contacting a feed gas mixture comprising the alcohol fuel with a reforming catalyst in a reforming reaction zone to produce a product reformate gas mixture comprising hydrogen. The reforming catalyst comprises a metal sponge supporting structure and a copper coating at least partially covering the surface of the metal sponge supporting structure. The metal sponge supporting structure is prepared by a process comprising leaching aluminum from an alloy comprising aluminum and a base metal. In accordance with one embodiment, the reforming catalyst is prepared by depositing copper on the metal sponge supporting structure. An intake gas mixture comprising oxygen and the product reformate gas mixture is introduced into a combustion chamber of an internal combustion engine and combusted to produce an exhaust gas mixture. An exhaust gas effluent comprising the exhaust gas mixture is discharged from the combustion chamber and the energy of combustion is utilized for the generation of mechanical or electrical power. The exhaust gas effluent is brought into thermal contact with the reforming reaction zone to heat the reforming catalyst therein.

In accordance with another embodiment of the present invention, a process for producing mechanical or electrical power from a fuel comprising ethanol is provided. The process comprises contacting a feed gas mixture comprising the ethanol fuel with a reforming catalyst in a reforming reaction zone to produce a product reformate gas mixture comprising hydrogen and methane. The reforming catalyst comprises copper at the surface of a metal supporting structure. An intake gas mixture comprising oxygen and the product reformate gas mixture is introduced into a combustion chamber of an internal combustion engine and combusted to produce an exhaust gas mixture. An exhaust gas effluent comprising the exhaust gas mixture is discharged from the combustion chamber and the energy of combustion is utilized for the generation of mechanical or electrical power. The exhaust gas effluent is brought into thermal contact with the reforming reaction zone to heat the reforming catalyst therein.

A further embodiment of the present invention for producing mechanical or electrical power from a fuel comprising ethanol comprises contacting a feed gas mixture comprising the ethanol fuel with a reforming catalyst comprising copper in a reforming reaction zone to produce a product reformate gas mixture comprising hydrogen, methane and a carbon oxide component selected from the group consisting of carbon monoxide, carbon dioxide and mixtures thereof. The molar ratio of methane to the carbon oxide component in the product reformate gas mixture is from about 0.9 to about 1.25 and the rate at which methane is produced in the reformate gas mixture is at least about 50% of the rate of ethanol introduced into the reforming reaction zone on a molar basis. An intake gas mixture comprising oxygen and the product reformate gas mixture is introduced into a combustion chamber of an internal combustion engine and combusted to produce an exhaust gas mixture. The energy of combustion is utilized for the generation of mechanical or electrical power.

The present invention is further directed to a reformed alcohol power system for producing mechanical or electrical power from an alcohol fuel. The process comprises first contacting a feed gas mixture comprising the alcohol fuel with a reforming catalyst in a reforming reaction zone to produce a product reformate gas mixture comprising hydrogen. A prechamber gas mixture comprising oxygen and a first portion of the product reformate gas mixture is introduced into a combustion prechamber in fluid communication with a combustion chamber of an internal combustion engine. An intake gas mixture comprising oxygen and a second portion of the product reformate gas mixture is introduced into the combustion chamber. The prechamber gas mixture is ignited in the combustion prechamber to generate a hydrogen-rich flame jet and cause combustion of the intake gas mixture introduced into the combustion chamber, thereby producing an exhaust gas effluent. The energy of combustion is utilized for the generation of mechanical or electrical power.

In another embodiment of the reformed alcohol power system, a feed gas mixture comprising ethanol is contacted with a reforming catalyst in a reforming reaction zone to produce a product reformate gas mixture comprising hydrogen and methane. A prechamber gas mixture comprising oxygen and a first portion of the product reformate gas mixture or the ethanol fuel is introduced into a combustion prechamber in fluid communication with a combustion chamber of an internal combustion engine. An intake gas mixture comprising oxygen and fuel is introduced into the combustion chamber. The prechamber gas mixture is ignited in the combustion prechamber to generate a flame jet and cause combustion of the intake gas mixture introduced into the combustion chamber, thereby producing an exhaust gas effluent. The energy of combustion is utilized for the generation of mechanical or electrical power.

A still further embodiment of a reformed alcohol power system for producing mechanical or electrical power from an alcohol fuel comprises contacting a feed gas mixture comprising the alcohol fuel with a reforming catalyst in a reforming reaction zone to produce a product reformate gas mixture comprising hydrogen. An intake gas mixture comprising oxygen and the product reformate gas mixture is introduced into a combustion chamber of an internal combustion engine and combusted to produce an exhaust gas mixture. An exhaust gas effluent comprising the exhaust gas mixture is discharged from the combustion chamber and the energy of combustion is utilized for the generation of mechanical or electrical power. At least a portion of the exhaust gas effluent is recycled and combined with the intake gas mixture introduced into the combustion chamber of the internal combustion engine.

A still further embodiment is directed to a process for producing mechanical or electrical power in a power system comprising an internal combustion engine. The internal combustion engine utilizes a four-stroke power cycle and comprises at least one combustion chamber and an intake valve in fluid communication with the combustion chamber. The intake valve has an open and closed position. The internal combustion engine is capable of producing a combustion chamber expansion ratio that is greater than the corresponding compression ratio. The process comprises introducing an intake gas mixture comprising oxygen and a fuel selected from the group consisting of gasoline, alcohol, reformed alcohol and blends thereof into the combustion chamber of the internal combustion engine. The length of time the intake valve remains in the open position during the power cycle is controlled in response to the type of fuel introduced into the combustion chamber. The intake gas mixture is combusted in the intake gas mixture and the energy of combustion is utilized for the generation of mechanical or electrical power.

The present invention is further directed to a multi-stage process for reforming an alcohol fuel comprising ethanol. The process comprises contacting a feed gas mixture comprising the ethanol fuel with a reforming catalyst in a first reforming reaction zone at a temperature below about 400° C. to produce a partially reformed gas mixture comprising hydrogen and methane. The reforming catalyst comprises copper at the surface of a thermally conductive metal supporting structure. The partially reformed gas mixture is then contacted with a reforming catalyst in a second reforming reaction zone at a temperature higher than the temperature maintained in the first reforming reaction zone to reform methane contained in the partially reformed gas mixture and produce a product reformate gas mixture comprising additional hydrogen.

Other objects and features of this invention will be in part apparent and in part pointed out hereinafter.

DESCRIPTION OF THE PREFERRED EMBODIMENTS

Figure 1:
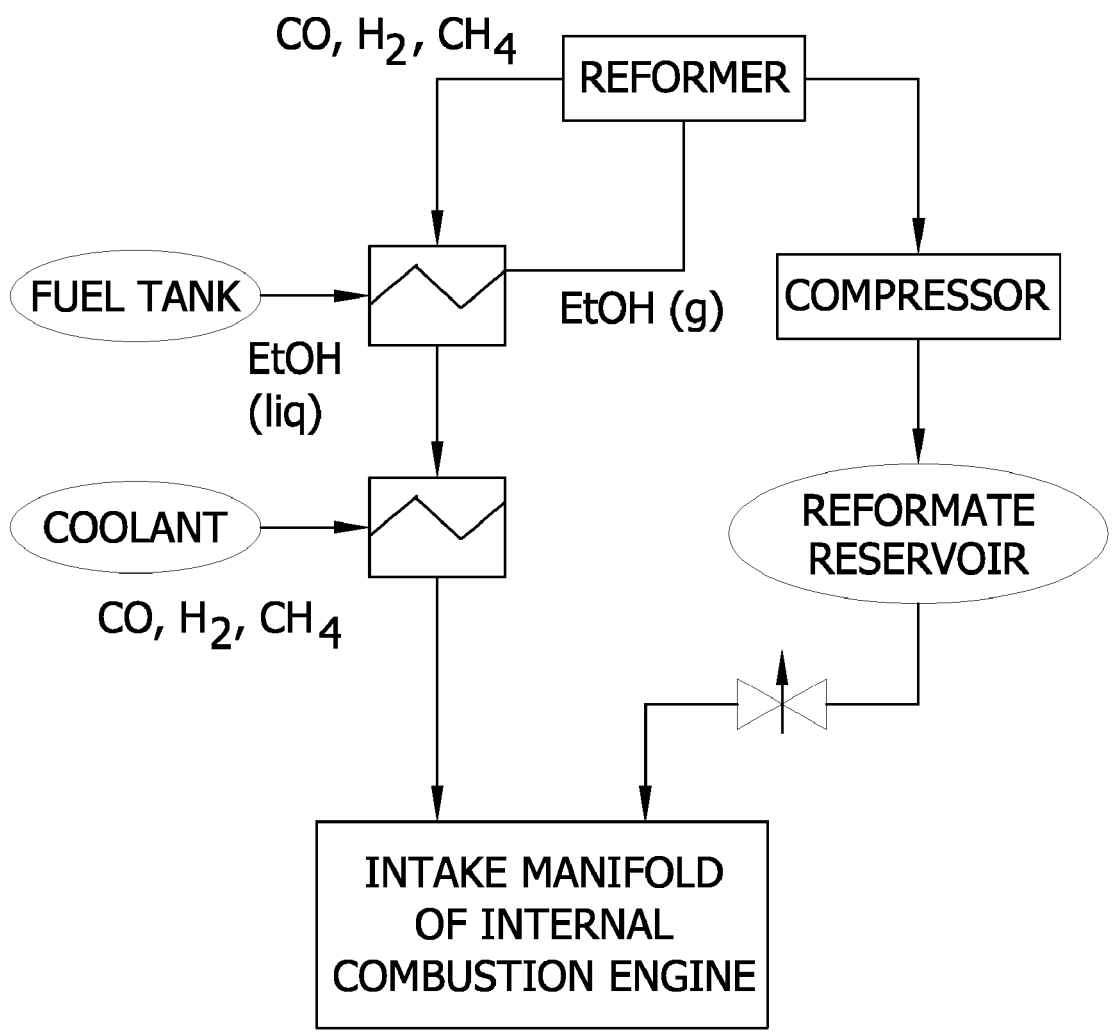
FIG. 1 is a schematic of a reformed alcohol power system which utilizes onboard storage of reformate gases.

In accordance with the present invention, improved alcohol reforming processes and reformed alcohol power systems utilizing those processes have been devised. The alcohol reforming processes preferably utilize a thermally conductive reforming catalyst that allows efficient, low-temperature reforming of an alcohol fuel to produce a reformate gas mixture comprising hydrogen. The present invention makes possible the efficient utilization of alcohol fuels in an internal combustion engine to generate electrical or mechanical power.

Without being bound to any particular theory, the increased efficiency of preferred embodiments of the disclosed invention is thought to occur by at least three mechanisms. First, the reforming process itself raises the lower heating value (LHV) of the fuel. In the case of ethanol, the LHV is raised by about 7%. As the energy required to drive the reforming reaction is provided at least in part by waste combustion exhaust, in preferred embodiments it is not necessary to use the fuel's heating value to drive the reaction and there is no offset of the increase in the LHV. Second, the reformate gas mixture is a high octane fuel which allows high compression ratios to be achieved. Third, the reformate gas mixture can be combusted under lean conditions as the reaction products are flammable at relatively dilute concentrations. The efficiency gains of the reforming process are verified by combustion modeling as described in Example 11.

In one preferred embodiment of the present invention, hydrogen-containing gas mixtures for burning in an internal combustion engine are produced by reforming an alcohol fuel in a manner that allows the thermal energy demands of the reformer to be satisfied using waste heat recovered from the engine exhaust. In another preferred embodiment, low-temperature reforming of an ethanol fuel produces a product reformate gas mixture comprising hydrogen and methane, while minimizing deactivation of the reforming catalyst due to coking. The invention disclosed herein provides advantages over other technologies used in exploiting the fuel value of alcohols with high efficiency, including the conversion of alcohols to hydrogen via conventional high-temperature reforming processes and utilization of the hydrogen-containing reformate in fuel cells of vehicular power systems.

A. The Alcohol Fuel

A feed gas mixture comprising an alcohol fuel is contacted with the reforming catalyst in a reforming reaction zone of the reformer. Preferably, the alcohol fuel comprises a primary alcohol such as methanol, ethanol and mixtures thereof. In accordance with an especially preferred embodiment, the alcohol fuel comprises ethanol. The preferred reforming catalyst used in the practice of the present invention is particularly efficient in the low-temperature reforming of ethanol-containing feed gas mixture, enabling this environmentally and economically attractive fuel to be utilized efficiently in a vehicular power system of relatively modest cost.

The use of a hydrogen-containing gaseous fuel produced from ethanol reforming provides an effective means of starting an ethanol-fueled vehicle at low temperatures, making it unnecessary to blend ethanol with gasoline, as in E85 blended fuels. However, reforming catalysts utilized in embodiments of the present invention are also useful in the reforming of blended ethanol/gasoline fuels (e.g., E85) as the sulfur in the gasoline portion of the fuel is not liberated during the reforming process due to the low temperatures at which the reforming reaction preferably occurs. Thus, sulfide poisoning of the copper surfaces of the catalyst does not appreciably occur.

In instances where sulfur poisoning does affect reformer performance, the impact can be minimized by use of low-sulfur gasoline in the blended fuel mixture. As the gasoline primarily serves as a starting aid, light-end alkanes generally very low in sulfur such as isooctane are preferred. Alternatively or in addition, a bed of high surface area Raney copper can be included upstream of the reforming reaction zone to adsorb sulfur and protect the reforming catalyst and, optionally, to act as a preheater and/or evaporator. Raney copper is relatively inexpensive and can easily be replaced as necessary.

The practice of the present invention allows for use of alcohol fuels that contain water. Current ethanol fuels are typically substantially anhydrous and a considerable portion of the cost of producing fuel-grade ethanol results from the dehydration step. Moreover, anhydrous ethanol, unlike ethanol containing water, cannot be transported in the existing pipeline infrastructure as the ethanol would ready absorb water present in the pipeline. Thus, in the practice of the present invention, it is not necessary to dehydrate the ethanol fuel stock and the cost of producing the ethanol fuel can be reduced. Further, use of the present invention in vehicular power systems enables ethanol to be distributed via the current petroleum pipeline infrastructure rather than by rail car.

As noted above, the alcohol fuel used in the feed mixture fed to the reformer preferably comprises ethanol. However, alcohol feed mixtures comprising methanol and methanol-ethanol blends, optionally further containing water, may also be used. In one preferred embodiment of the present invention, the alcohol feed mixture comprises an approximately 1:1 molar mixture of ethanol and water, or approximately 70% by volume ethanol. In another preferred embodiment of the present invention, the water content of the alcohol feed mixture comprising ethanol is reduced to no more than about 10% by weight, and even more preferably to no more than about 5% by weight.

B. Low-Temperature Alcohol Reforming

In accordance with the present invention and described in further detail below, alcohol fuel in a feed gas mixture is introduced into the reformer and decomposed into a hydrogen-containing gas over an alcohol reforming catalyst (e.g., a copper-plated Raney nickel catalyst) in the reforming reaction zone. Reaction equation (6) depicts the reforming of methanol, while reaction equation (7) depicts the reforming of ethanol in the feed mixture introduced into the reformer. If the feed mixture containing the alcohol fuel further contains water (e.g., at least one mole of water per mole of alcohol), the hydrogen content of the of the reformate gas mixture may be enriched by reaction of carbon monoxide with water to form carbon dioxide and hydrogen via the water-gas shift reaction shown by reaction equations (8) and (5). The reforming catalysts described below may exhibit some degree of water-gas shift activity or a separate water-gas shift catalyst may optionally be employed. The hydrogen-containing product reformate gas mixture refers to the gas exiting the reforming reaction zone and following any optional water-gas shift reaction.

Methanol without water-gas shift:

$$CH_3OH \rightarrow 2H_2 + CO \quad (6)$$

net after water-gas shift:

$$CH_3OH + H_2O \rightarrow 3H_2 + CO_2 \quad (8)$$

Ethanol without water-gas shift:

$$CH_3CH_2OH \rightarrow H_2 + CO + CH_4 \quad (7)$$

net after water-gas shift:

$$CH_3CH_2OH + H_2O \rightarrow CH_4 + CO_2 + 2H_2 \quad (5)$$

C. The Alcohol Reforming Catalyst

The alcohol reforming reaction is strongly endothermic and efficient heat transfer to the reforming reaction zone is desired for good conversion. In accordance with preferred embodiments of the present invention, mixtures of copper and other metals, particularly mixtures of copper and nickel, are used as catalysts for the low-temperature dehydrogenation (i.e., reforming) of alcohols. Copper-containing catalysts comprising a thermally conductive metal supporting structure, for example, a catalyst prepared by depositing copper onto a nickel sponge supporting structure, show high activity as catalysts in gas-phase reforming of primary alcohols such as methanol and ethanol. The catalysts used in the practice of the present invention are more stable in and particularly active for the thermal decomposition of ethanol into hydrogen, methane, carbon monoxide and carbon dioxide at low temperature.

In one preferred embodiment of the invention, the alcohol dehydrogenation or reforming catalyst comprises a copper-containing active phase or region at the surface of a metal supporting structure comprising copper and/or one or more non-copper metals. The catalyst generally comprises at least about 10% by weight copper, preferably from about 10% to about 90% by weight copper and more preferably from about 20% to about 45% by weight copper. The catalyst may comprise a substantially homogeneous structure such as a copper sponge, a copper-containing monophasic alloy or a heterogeneous structure having more than one discrete phase. Thus, the copper-containing active phase may be present at the surface of the supporting structure as a discrete phase such as a copper coating or an outer stratum; as a surface stratum, or as part of a homogeneous catalyst structure. In the case of a copper-containing active phase comprising a discrete phase at the surface of the supporting structure, the metal supporting structure may be totally or partially covered by the copper-containing active phase. For example, in a particularly preferred embodiment, the catalyst comprises a copper-containing active phase at the surface of a metal sponge supporting structure comprising nickel. Such catalysts comprise from about 10% to about 80% by weight copper and more preferably from about 20% to about 45% by weight copper. The balance of the catalyst preferably consists of nickel and less than about 10% aluminum or other metals by weight. Further, in preferred embodiments wherein the metal supporting structure comprises nickel, it is important to note that copper and nickel are miscible in all proportions. Thus, catalysts comprising a copper-containing active phase at the surface of a nickel supporting structure may not necessarily have a phase boundary between the copper-containing active phase and the supporting structure.

As is common in catalysis, the activity of the dehydrogenation catalyst is improved by increasing the surface area. Thus, it is typically preferred for freshly-prepared catalyst comprising a metal sponge supporting structure to have a surface area of at least about 10 m²/g as measured by the Brunauer-Emmett-Teller (BET) method. More preferably, the catalyst has a BET surface area of from about 10 m²/g to about 100 m²/g, even more preferably the catalyst has a BET surface area of from about 25 m²/g to about 100 m²/g, and still more preferably the catalyst has a BET surface area of from about 30 m²/g to about 80 m²/g.

In a certain preferred embodiment for the reforming of ethanol, the surface of the catalyst preferably contains an amount of nickel atoms which promote the decarbonylation of aldehydes such as acetaldehyde. Preferably, the surface comprises from about 5 to about 100 µmol/g of nickel as measured by the method described in Schmidt, "Surfaces of Raney® Catalysts," in *Catalysis of Organic Reactions*, pp. 45-60 (M. G. Scaros and M. L. Prunier, eds., Dekker, New York, 1995). More preferably, the surface nickel concentration is from about 10 µmol/g to about 80 µmol/g, most preferably from about 15 µmol/g to about 75 µmol/g.

Importantly, the preferred copper-containing catalysts comprising a metal supporting structure described herein exhibit superior heat conductivity as compared to conventional reforming catalysts comprising ceramic supports. The copper-containing catalysts comprising a metal supporting structure in accordance with one embodiment of the present invention preferably exhibit a thermal conductivity at 300K of at least about 50 W/m·K, more preferably at least about 70 W/m·K and especially at least about 90 W/m·K.

Suitable metal supporting structures may comprise a wide variety of structures and compositions. Preferably, the metal supporting structure comprises a non-copper metal selected from the group consisting of nickel, cobalt, zinc, silver, palladium, gold, tin, iron and mixtures thereof, more preferably selected from the group consisting of nickel, cobalt, iron and mixtures thereof. Even more preferably, the metal supporting structure comprises nickel. Nickel is typically most preferred because, for example: (1) nickel is relatively inexpensive compared to other suitable metals such as palladium, silver and cobalt; (2) combinations of nickel and copper have been shown to promote the decarbonylation of acetaldehyde to methane and carbon monoxide; and (3) depositing copper onto a nickel-containing supporting structure (e.g., by electrochemical displacement deposition) is typically less difficult relative to depositing copper onto a supporting structure containing a significant amount of the other suitable metals. In such a preferred embodiment, at least about 10% by weight of the metal supporting structure is non-copper metal. In one particularly preferred embodiment, at least about 50% (more preferably at least about 65%, at least about 80%, at least about 85% or even at least about 90%) by weight of the metal supporting structure is non-copper metal. In another embodiment, the supporting structure comprises at least about 10% by weight non-copper metal and at least about 50% (more preferably from about 60% to about 80%) by weight copper. The non-copper metal may comprise a single metal or multiple metals. When the metal supporting structure comprises more than one metal, it is preferred that at least about 80% by weight (more preferably at least about 85% by weight, even more preferably at least about 90% by weight, and still even more preferably essentially all) of the metals in the supporting structure are in the form of an alloy.

In an especially preferred embodiment, the supporting structure is a metal sponge comprising copper and/or one or more of the suitable non-copper metals listed above. As used herein, the term "metal sponge" refers to a porous form of metal or metal alloy having a BET surface area of at least about 2 m²/g, preferably at least about 5 m²/g, and more preferably at least about 10 m²/g. Particularly preferred metal sponge supporting structures have a BET surface area of at least about 20 m²/g, more preferably at least about 35 m²/g, even more preferably at least about 50 m²/g, and still more preferably at least about 70 m²/g. It has been found in accordance with this invention that a copper-containing active phase at the surface of a metal sponge supporting structure results in a material exhibiting the mechanical strength, high surface area, high thermal conductivity and density of the sponge supporting structure combined with the desired catalytic activity of the copper. Metal sponge supporting structures can be prepared by techniques generally known to those skilled in the art. Suitable metal sponges include the material available from W.R. Grace & Co. (Davison Division, Chattanooga, Tenn.) under the trademark RANEY as well as materials generally described in the art as "Raney metals," irrespective of source. Raney metals may be derived, for example, by leaching aluminum from an alloy of aluminum and one or more base metals (e.g., nickel, cobalt, iron and copper) with caustic soda solution. Suitable commercially-available nickel sponges include, for example, RANEY 4200 (characterized by the manufacturer as having at least 93 wt. % Ni; no greater than 6.5 wt. % Al; no greater than 0.8 wt. % Fe; an average particle size in the range of 20-50 µm; a specific gravity of approximately 7; and a bulk density of 1.8-2.0 kg/l (15-17 lbs/gal) based on a catalyst slurry weight of 56% solids in water). The metal supporting structure is preferably substantially free of unactivated regions and has been washed substantially free of aluminum oxides. Unreacted aluminum tends to react with steam under reforming conditions to form aluminum oxides which can obstruct diffusion and provide acid sites for ethanol dehydration.

The copper-containing active phase may be deposited at the surface of a metal supporting structure using various techniques well known in the art for depositing metal onto metal surfaces. These techniques include, for example, liquid phase methods, such as electrochemical displacement deposition and electroless plating; and vapor phase methods such as physical deposition and chemical deposition. It is important to note that copper is at least partially miscible with most supporting structure metals of interest and is completely miscible with nickel. Thus, it has been found that the copper deposition process may result in the catalyst having copper, or more particularly a copper-containing active phase or region at the surface of the supporting structure as part of a discrete phase such as an outer stratum or coating, at the surface of the supporting structure as part of a surface stratum, or copper may migrate from the surface of the supporting structure into the bulk of the supporting structure. Without being held to a particular theory, it is believed that the catalyst surface can move, sinter or otherwise restructure during the reaction conditions of the deposition and alcohol reforming processes resulting in such variations of form in the copper-containing active phase. Nonetheless, it has been found that the copper deposition process results in an overall increase in the copper content of the catalyst with the deposited copper predominantly present at or near the surface of the freshly prepared catalyst, which is richer in copper than before deposition. A particularly preferred alcohol reforming catalyst comprises a copper-plated Raney nickel sponge, or a copper-plated, copper-doped Raney nickel sponge. If copper-doped Raney nickel is employed as the metal supporting structure, the copper content of the metal sponge is preferably less than about 10% by weight.

The alcohol reforming catalyst does not have to comprise copper coated on a metal supporting structure (i.e., there may be no discrete copper-containing active phase deposited on or coating the surface of the catalyst). Rather, the copper may be mixed with other metals that provide desirable properties in a catalyst composition having a copper-containing active phase at the surface thereof. The catalyst composition may be substantially homogeneous. Preferably, such a catalyst is in the form of a copper-containing metal sponge (e.g., a nickel/copper sponge).

Suitable alcohol reforming catalyst compositions for use in the practice of the present invention and methods and materials for their preparation are described by Morgenstern et al. in co-assigned U.S. Patent Application Pub. Nos. US 2004/0137288 A1 and US 2002/0019564 A1; U.S. Pat. No. 6,376,708; and in "Low Temperature Reforming of Ethanol over Copper-Plated Raney Nickel: A New Route to Sustainable Hydrogen for Transportation," *Energy and Fuels*, Vol. 19, No. 4, pp. 1708-1716 (2005), the entire contents of which are incorporated herein by reference.

While catalysts comprising a metal sponge supporting structure having a copper-containing active phase at the surface as described above are particularly preferred because of their high thermal conductivity, catalysts comprising an active phase containing copper or mixture of copper and nickel at the surface of a non-metallic support may also be used in the low-temperature reforming of alcohol. In this context, non-metallic means not in the metallic state and therefore, for example, not electrically conductive at ambient temperature. Many oxide supports commonly used for catalysts, such supports comprising alumina ($Al_2O_3$), lanthanum oxide ($La_2O_3$), silica ($SiO_2$), titania ($TiO_2$), zirconia ($ZrO_2$), siloxane, barium sulfate and mixtures thereof contain metal atoms, but are thermally and electrically insulating and, accordingly, are not classified as metals. Carbon supports have some electrical conductivity, but can be considered non-metallic for purposes of this specification. The non-metallic support should be selected so that it is chemically stable under the conditions of the reforming reaction and exhibits a high enough surface area to provide sufficient activity for the reforming reaction. It is typically preferred that freshly-prepared catalyst comprising a non-metallic supporting structure have a surface area of at least about 200 $m^2$/g as measured by the Brunauer-Emmett-Teller (BET) method. Catalysts prepared with a non-metallic supporting structure generally comprises at least about 10% by weight copper, preferably from about 10% to about 90% by weight copper and more preferably from about 20% to about 45% by weight copper.

Catalysts comprising copper or mixtures of copper and nickel on such non-metallic, insulating supports are active for low-temperature alcohol reforming. As shown in Example 9, suitable catalysts can be prepared by copper plating a nickel catalyst on a non-metallic, insulating support using methods similar to those used for copper plating metal sponge supports. Example 10 demonstrates that a copper-nickel catalyst on a non-metallic support (e.g., $SiO_2$) is active for ethanol reforming above about 200° C., but at elevated temperatures (e.g., above about 220° C.) selectivity is decreased due to the undesired side reaction of methanation.

When the alcohol reforming catalyst is prepared by electrochemical displacement deposition of copper onto the surface of the supporting structure (regardless of whether a metallic supporting structure or a non-metallic, insulating support is utilized), it is particularly preferable that the surfaces of the support onto which copper is deposited contain nickel because nickel has several desirable characteristics, including: (1) a reduction potential to the metal which is less than the reduction potential to the metal of copper; (2) relative stability in the alcohol dehydrogenation reaction conditions of this invention; (3) greater mechanical strength and resistance to attrition than copper; and (4) nickel/copper catalysts promote the decarbonylation of acetaldehyde to carbon monoxide and methane.

D. Reformer Design

The alcohol reforming process of the present invention generally comprises contacting the feed gas mixture comprising the alcohol fuel with the reforming catalyst in a reforming reaction zone of the reformer. As described in further detail below, the reforming catalyst used in the practice of the present invention exhibiting high activity for low-temperature reforming of alcohols is suitable for incorporation into a compact and thermally efficient heat exchanger-reformer.

The reforming reaction zone preferably comprises a continuous flow system configured to ensure low back-pressure and efficient heat transfer for initiating and sustaining the endothermic reforming reaction. Reformer designs to achieve efficient heat transfer are well known and described, for example, by Buswell et al. in U.S. Pat. No. 3,522,019 and Autenrieth et al. in U.S. Pat. Nos. 5,935,277 and 5,928,614. These patents describe catalytic alcohol reforming reactors in which heat is supplied to the reforming reaction zone by indirect heat exchange with a heat source through a heat-conducting wall. Heat sources for heating the reforming reaction zone include exhaust gases from the partial oxidation of a portion of the alcohol being reformed or from a separate combustion reaction using the alcohol or another fuel source. As described below, a particularly preferred embodiment of the present invention employs exhaust gas effluent discharged from a combustion chamber of a downstream internal combustion engine in which the reformate product mixture is burned as the heat source for the reforming reaction zone by bringing the exhaust gas effluent into thermal contact with the reforming reaction zone to heat the reforming catalyst. When exhaust gases are used as the heat source for heating the reforming reaction zone, the alcohol feed stream and the exhaust stream are preferably not mixed. By not mixing the exhaust and reformate streams, better control over the air:fuel ratio is achieved in the engine and poisoning byproducts of the thermal and oxidative decomposition of engine lubricating oil is avoided, but heat transfer is rendered more difficult than would be the case if the gases were simply mixed. Therefore, the catalyst and reformer body are preferably fabricated from materials possessing high thermal conductivity. For this reason, the reforming catalysts comprising a copper-containing active phase at the surface of a metallic sponge supporting structure described herein are particularly preferred in the practice of the present invention.

The heat exchanger functions as an alcohol reformer into which a stream of the alcohol feed mixture is fed where it contacts the reforming catalyst and is heated to reaction temperature by indirect heat transfer to the reforming reaction zone. The alcohol feed stream may first be evaporated and at least partially heated to the reforming reaction temperature in a separate heat exchanger upstream from the reforming reaction zone. In one embodiment, the vaporization of the alcohol feed is conducted in an evaporator heated by coolant circulating through the internal combustion engine of the reformed alcohol power system. Although vaporization of the alcohol feed can also be accomplished in the reformer, the use of a separate evaporator avoids the risk that non-volatile solutes in the fuel will deposit on the reforming catalyst. In addition, a separate evaporator heated with engine coolant supplements the vehicle's radiator in maintaining the temperature of the engine coolant.

In one preferred embodiment, the vaporization of the alcohol feed to the reformer is conducted in an evaporator heated by the product reformate gas mixture. The evaporator may be separate from or integrated in the same unit as the reformer. In addition to evaporating the fuel, this serves to cool the reformate gas mixture prior to introduction into the internal combustion engine. Reducing the temperature of the reformate gas mixture improves engine volumetric efficiency and peak power of an internal combustion engine fed with the cooled reformate by reducing the amount of air displaced in the cylinder (i.e., combustion chamber) by the hot gaseous fuel. Optionally, in order to achieve a more compact design, the alcohol vaporization and reforming functions may be conducted in a single unit.

In one preferred embodiment, the reformer is designed to achieve rapid and efficient heat transfer from the exhaust of an internal combustion engine to the alcohol feed mixture, allowing the system to be effectively operated at lower exhaust temperatures, thereby enabling leaner combustion in the engine. In addition, the high thermal conductivity of the preferred metallic reforming catalyst enables more rapid startup of the reformer.

Preferably, the heat exchanger-reformer is constructed so that the thermal pathway by which heat is transferred to the alcohol feed stream is nearly entirely metallic. Preferred metals for the construction of the heat exchange surfaces of the reformer that separate the alcohol feed stream from exhaust of an internal combustion engine or other suitable heat exchange fluid are those resistant to corrosion, compatible with the reforming catalyst and possess high thermal conductivity. Copper, nickel, and alloys thereof are especially preferred metals. Because the use of thin metallic sheets is preferred, the sheets may be reinforced by wire mesh or other means well known in the art of heat exchanger design, so that the reformer's structure can resist deformation and the effects of vibration (e.g., in vehicular power system applications). Because copper does not catalyze the formation of soot in the reforming process of the present invention, components of the reformer exposed to the reforming reaction zone are preferably constructed of materials that contain a copper-rich surface. Likewise, it is also preferred that components upstream of the reformer that contact the alcohol fuel at elevated temperature, (e.g., components of the evaporator or preheater) be constructed having a copper-rich surface. A copper-rich surface can be achieved by using copper-rich alloys such as MONEL as the construction material or by plating metals, for example steel, with copper. A process for producing a system component with a copper surface by copper plating is described in Example 1.

Optionally, a bed of water-gas shift catalyst may be provided downstream of the reforming reaction zone. The water-gas shift bed is preferably not in thermal contact with the exhaust gas effluent used to heat the reforming reaction zone since the exit temperature of the reformate is typically adequate to conduct the water-gas shift reaction. Such catalysts are well known in the art and compact water-gas shift catalytic units suitable for incorporation in vehicular reformers have been described by P. Gray and C. Jaffray in "Fuel Cells for Automotive Applications," R. Thring Ed. Wiley, New York, 2004, pp. 61-73 and by B. J. Bowers, J. L. Zhao, D. Dattatraya and M. Ruffo in *SAE Special Publication* 1965 (Applications of Fuel Cells in Vehicles), 2005, pp. 41-46.

Incorporation of a water-gas shift catalyst bed is not necessary if anhydrous alcohol is used as the fuel, nor is it necessary if the reformer is not used onboard a vehicle. For vehicular applications, however, the use of a water-gas shift catalyst bed causes carbon monoxide in the reformate to be reduced, which may serve to reduce carbon monoxide emissions from the vehicle. However, because the water-gas shift reaction is exothermic, it reduces the lower heating value of the reformate (e.g., from 317 to 307 kcal/mol for ethanol). In addition, the water-gas shift bed adds cost and weight to the vehicle. For these reasons, operation without the water-gas shift bed is generally preferred, except in applications where minimizing carbon monoxide is a concern.

The heat exchanger-reformer is preferably insulated in order to minimize loss of heat to the environment. This enables the reforming reaction zone to be sufficiently heated using lower temperature exhaust gases from an internal combustion engine of the reformed alcohol power system. The temperature of the reforming catalyst and alcohol feed stream is preferably regulated by metering the flow of exhaust gases through the reformer by providing two exhaust pathways, one through the reformer and one bypassing it. In engine configurations that utilize exhaust gas recirculation (EGR), it is preferred to use the cooled exhaust gas stream exiting the reformer as the recirculated gas rather than the exhaust stream which bypasses the reformer. This design allows for increased volumetric efficiency and is more effective in reducing $NO_x$ and improving engine thermodynamic efficiency.

It should be understood that although the alcohol fuel reforming processes and reformer designs disclosed herein have particular application in reformed alcohol power systems onboard vehicles, the reforming processes and reformers may also advantageously be used in stationary applications as well as applications independent of power generation, (e.g., in production of reformate fuel).

E. Incorporation of Preferred Catalysts into the Reformer

The metal supporting structure (e.g., metal sponge support), non-metallic or ceramic supports and the alcohol reforming catalyst having the copper-containing active phase at the surface thereof may be in the form of a powder for packed or fixed bed reformer applications. Alternatively, a fixed bed reformer may utilize a copper-containing catalyst comprising a metal supporting structure or non-metallic support in the form of a larger size pellet. Examples of such shaped supporting structures include the nickel sponge pellets described in European Patent Application Publication No. EP 0 648 534 A1 and U.S. Pat. No. 6,284,703, the disclosures of which are incorporated herein by reference. Nickel sponge pellets, particularly for use as fixed bed catalysts, are available commercially, for example, from W.R. Grace & Co. (Chattanooga, Tenn.) and Degussa-Huls Corp. (Ridgefield Park, N.J.). Still further, the alcohol reforming catalyst may be used in the form of a monolith produced by incorporating the catalyst onto the surface of a suitable substrate (e.g., the surface of a non-porous sheet or foil or foraminous honeycomb substrate). Generally, catalyst in the form of pellets and monoliths are preferred to minimize back-pressure in the reformer. Further, monolithic catalysts may be more stable against mechanical degradation caused by vibration (e.g., in a vehicular power system application) and/or chemical attack in the alcohol reforming reaction medium.

It is important to note that when the catalyst of the invention is used in the form of a pellet or monolith, it is contemplated that only a portion of the pellet or monolith may comprise a metal sponge or non-metallic support for supporting the copper-containing active phase. That is, the alcohol reforming catalyst may comprise a non-porous substrate to provide strength and shape to a fixed bed or monolithic catalyst while still providing one or more porous (e.g., metal sponge) regions having a BET surface area of preferably at least about 10 $m^2/g$ for supporting the copper-containing active phase. Suitable non-porous materials for use as fixed bed or monolithic substrates generally may include any material that is thermally and chemically stable under copper plating and reforming conditions. Although non-metal substrates may be used, metal substrates such as nickel, stainless steel, copper, cobalt, zinc, silver, palladium, gold, tin, iron and mixtures thereof are typically more preferred. Unactivated aluminum and aluminum alloys are preferably avoided in the substrate as they react with ethanol and steam at the reforming temperature.

When the metal sponge support is in the form of a powder, the preferred average particle size of the metal sponge is at least about 0.1 µm, preferably from about 0.5 to about 100 µm, more preferably from about 15 to about 100 µm, even more preferably from about 15 to about 75 µm, and still even more preferably from about 20 to about 65 µm. When the catalyst is in the form of a pellet or a monolith, the dimensions of the pellet or the monolithic substrate upon which the copper-containing active phase is incorporated, as well as the size of any foramenal openings in monolithic structures, may vary as needed in accordance with the design of the reformer as understood by those skilled in the art.

As shown in Example 2 below, a dry, copper-plated Raney nickel reforming catalyst in the form of a powder can be prepared such that it packs at a density of at least about 1.8 g/cm$^3$. The high packing density of such a powder catalyst renders it suitable for use in an onboard fixed bed reformer in vehicular power system applications. Because the metal structure is hard, attrition is not a significant problem as might arise in the case of catalysts supported on alumina and other non-metallic or ceramic supports. Reforming catalyst in the form of pellets and other shaped catalyst are also suitable for fixed bed reformer applications, but typically exhibit lower packing densities and therefore may require a larger reformer. Generally, selection of a particular reforming catalyst system and the attendant consequences with respect to reformer design will be apparent to those skilled in the art and can be modified accordingly to meet the objectives of a particular application.

To quantify the efficiency of a vehicle running on ethanol (or other) fuels, it is conventional to express the efficiency as the power produced divided by the lower heating value of the fuel. In the case of ethanol, the lower heating value is 1235.5 kJ/mol as shown in the reaction equation below.

$$CH_3CH_2OH(l) + 3 O_2 \rightarrow 2CO_2 + 3H_2O(g) \; \Delta H_f = -1235.5 \text{ kJ/Mole}$$

Figure 8:
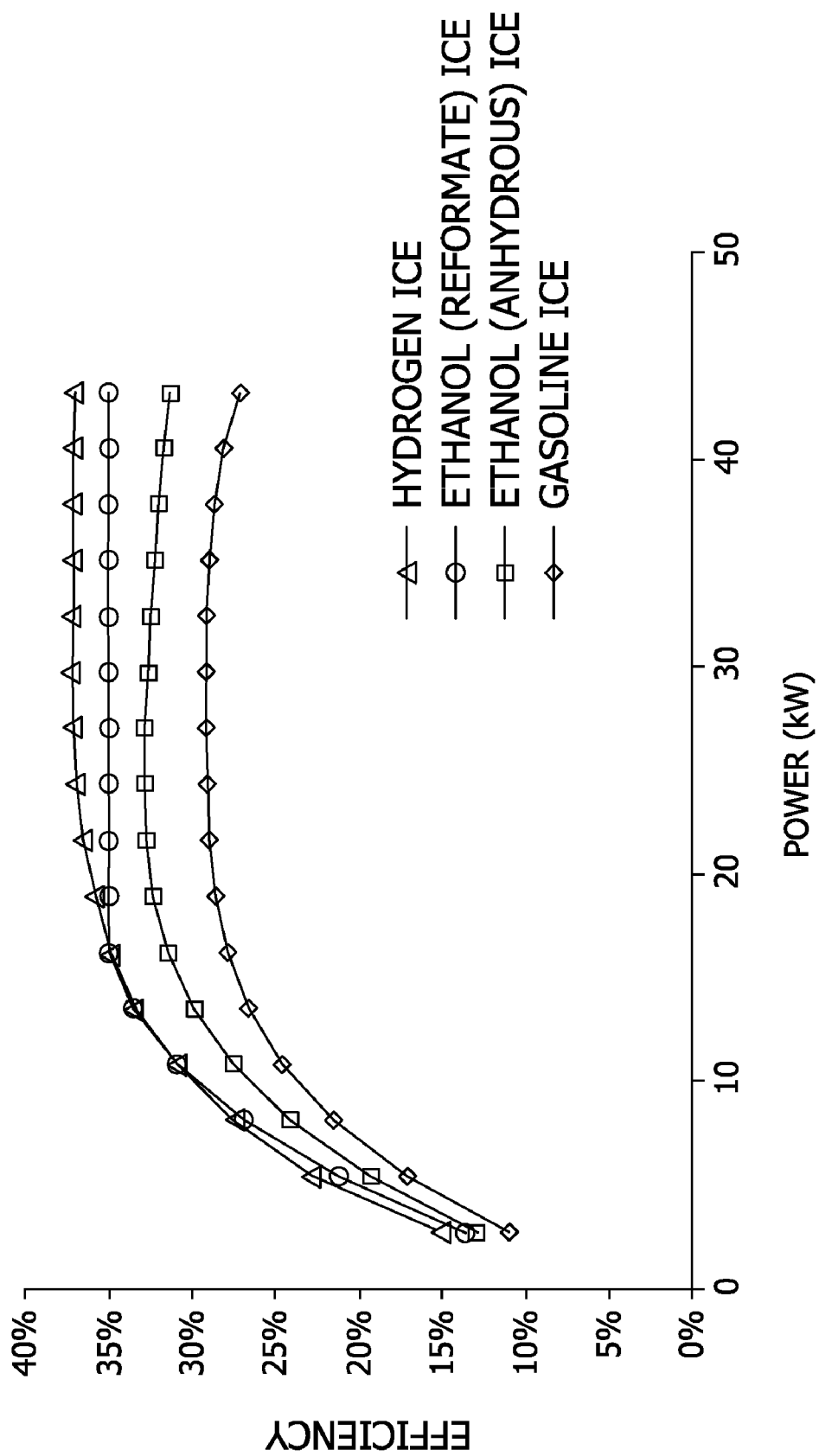
FIG. 8 is a graphical depiction comparing the predicted peak engine efficiency of an ethanol reformate internal combustion engine power system with that of hydrogen, ethanol and gasoline power systems as simulated in Example 11.

The reformer can be scaled by assuming that the engine mechanical power out is 35% of the lower heating value of the ethanol fuel. The 35% figure is reasonable in light of the predicted peak efficiency of a reformate system as shown in FIG. 8 and described in Example 11 below.

The following calculations illustrate determining the scale required for an onboard fixed or packed bed reformer using a powdered reforming catalyst such as the catalyst prepared in Example 2. Consider, for example, a 100 kW vehicle powered by an internal combustion engine running on a low-temperature ethanol reformate mixture produced in accordance with the present invention and comprising hydrogen, methane and carbon monoxide.

The fuel required at peak power is 13.9 mol/min (639 g/min) as determined from the following equation:

$$\text{EtOH\_flow}\left(\frac{\text{mol}}{\text{min}}\right) * 1235.5 \frac{\text{kJ}}{\text{mol}} * 35\% = 100\frac{\text{kJ}}{\text{sec}} * 60\frac{\text{sec}}{\text{min}}$$

As described by Morgenstern et al. in "Low Temperature Reforming of Ethanol over Copper-Plated Raney Nickel: A New Route to Sustainable Hydrogen for Transportation," *Energy and Fuels*, Vol. 19, No. 4, pp. 1708-1716 (2005) and shown in FIG. 5a of that publication, 2.5 g of this type of powdered catalyst completely reforms 0.1 ml/min of 70% ethanol (0.060 g ethanol/min) at 270° C. with negligible backpressure. The catalyst for those experiments was contained in a 0.375 in. (9.5 mm) internal diameter tube. The cross-sectional area of the inside of the tube is 0.7 cm$^2$, thus height of the catalyst bed is approximately 2 cm.

The same Morgenstern et al. publication indicates that the activation energy for ethanol reforming over copper-plated Raney nickel is 120 kJ/mole. For design purposes, a maximum operating temperature for the catalyst of 350° C. might be assumed, which would increase the activity of the catalyst 30-fold over operation of the catalyst at 270° C. The minimum exhaust temperature for an engine running on reformed methanol is reported as 350° C. in FIG. 10 of *JSAE Review*, 1981, 4, 7-13, authored by T. Hirota. Thus, 2.5 g of catalyst could completely reform 30×0.06=1.84 g ethanol/min. To provide adequate catalyst for a 100 kW engine at a reforming temperature of 350° C. requires 869 g of catalyst in accordance with the following equation:

$$\text{Catalyst\_required} = \frac{2.5 \text{ g catalyst} * 639 \text{ g ethanol/min}}{1.84 \text{ g ethanol/min}} = 869 \text{ g catalyst}$$

A 869 g quantity of the powdered catalyst occupies 483 cm$^3$. If the bed height is 5 cm, in order to minimize backpressure, a disk-shaped reformer packed with a fixed bed of powdered reforming catalyst 11 cm in diameter and 5 cm high is adequate for a vehicle with a 100 kW. Such a reformer may be constructed simply by first feeding a feed mixture comprising ethanol and optionally water to a heat exchanger where it is heated to reforming temperature and then feeding the heated ethanol stream to a packed bed of copper-plated Raney nickel. The ethanol stream is preferably vaporized in the heat exchanger utilizing heat from engine coolant. In the heat exchanger-reformer, the feed mixture may be heated to reforming temperature utilizing heat from the exhaust of an internal combustion engine. The exhaust also supplies the heat required for the endothermic reforming reaction. Preferably, in a fixed bed reformer embodiment, the catalyst and heat exchanger are integrated by packing catalyst into an insulated container equipped with tubes through which exhaust passes, supplying heat to the reforming catalyst and the ethanol stream. Integration of the heat exchanger and catalyst improves thermal response time. Performance is improved particularly when the vehicle must accelerate quickly after sitting at idle when the heat available from the engine exhaust is relatively low.

In an embodiment where the alcohol reforming reaction is conducted in a fixed or packed bed reformer containing a powdered copper-containing catalyst as described above, measures may be taken to minimize back-pressure by, for example, adding an inert solid diluent to the reforming catalyst bed to separate the catalyst particles and maintain spaces between them. The diluent is preferably a material free of acid sites which can catalyze dehydration of ethanol to ethylene and which is thermally stable under the alcohol reforming conditions. Silicon carbide and activated carbon which has not been acid-activated are examples of preferred diluents. Alternatively, back-pressure can be minimized by using a copper-containing catalyst comprising a metal sponge supporting structure in the form of pellets, rather than powders as described herein. In a further alternative preferred embodiment, the catalyst may be used in the form of a monolith produced by incorporating the alcohol reforming catalyst onto the surface of a suitable non-porous or foraminous substrate in order to minimize back-pressure within the reforming reactor.

In one preferred embodiment, the reforming catalyst is present as a layer or film of copper-plated metal sponge catalyst on one side of a non-porous foil or sheet substrate. The sheet is used to form the reforming reaction zone within the heat exchanger-reformer by techniques well known in the art, with the catalyst side in contact with the flow of the alcohol feed stream. Thus, the sheet coated with a film of the copper-plated metal sponge catalyst may be incorporated into plate-and-frame or spiral-wound heat exchanger designs. Alternatively, the sheets may be formed into tubes for use in a shell-and-tube heat exchanger reformer design. The latter is particularly preferred for alcohol reforming vehicular power applications, because it is compact and thermally efficient.

Sheet or foil substrates having a copper-containing Raney catalyst thereon may be produced by depositing, typically by thermal spraying, a layer of a nickel-aluminum or other suitable Raney alloy onto the substrate, activating the Raney alloy, and thereafter copper plating the activated alloy. Preferred Raney alloys for spray deposition onto sheet substrates include an approximately 50:50 (wt:wt) alloy of nickel and aluminum. The sheet substrate should be thermally and chemically stable under, activation, copper plating and reforming conditions and may generally comprise nickel, steel, copper or another metal, although non-metal substrates may be used. In order to avoid overly rapid cooling and for improved mechanical strength, the sheet substrate is preferably at least 20 µm thick. The thickness of the deposited Raney alloy layer or film is preferably from about 5 µm to about 500 µm, more preferably from about 10 µm to about 150 µm. The sprayed sheets are preferably handled with minimal bending prior to activation in order to prevent delamination of the layer of Raney alloy deposited thereon. The production of supported metal sponge films is described in U.S. Pat. No. 4,024,044; by Sillitto et al. in *Mat. Res. Soc. Proc.*, Vol. 549, pp. 23-9 (1999); and by P. Haselgrove and N. J. E. Adkins in Ceramic Forum International cfi\Ber. DKG 82 (2005) No. 11 E43-45.

The activation of Raney alloys by treatment with caustic is well known in the art, particularly for powders, and is readily adapted to activation of structured Raney alloys. Typically, activation may be achieved by treatment of the alloy with caustic (e.g., 20% NaOH) for two hours at a temperature of about 80° C., as described by D. Ostgard et al. in U.S. Pat. Nos. 6,284,703 and 6,573,213. Activation of Raney alloy on metal sheet or foil substrates is readily accomplished using similar techniques, as further described below in Example 5. The exact method of activation is not critical so long as adequate surface area is developed and the handling of the sheets is gentle enough to avoid excessive delamination of the catalytic layer. Once activated, the sheet or foil substrates are quite flexible and can readily mechanically manipulated and formed into a desired shape for reformer applications. Preferably the activated sheets are protected from air by, for example, operation under inert atmosphere or submersion in water before plating the Raney catalyst layer with copper. For this reason, the Raney alloy film on a sheet or foil substrate is preferably manipulated into the desired shape and assembled into the structure of the reformer after copper plating, and may be performed in ambient air.

Copper plating of Raney alloys coated on metal sheet or foil or other suitable substrates is preferably conducted by methods similar to those known in the art for Raney metal powders and described in the above-mentioned publications by Morgenstern et al., including co-assigned U.S. Patent Application Pub. Nos. US 2004/0137288 A1 and US 2002/0019564A1; U.S. Pat. No. 6,376,708; and "Low Temperature Reforming of Ethanol over Copper-Plated Raney Nickel: A New Route to Sustainable Hydrogen for Transportation," *Energy and Fuels*, Vol. 19, No. 4, pp. 1708-1716 (2005). Copper plating of Raney alloy coatings or films on metal sheet or foil substrates is suitably accomplished by circulating the plating bath over the substrate while minimizing bending or vibration of the substrate. Example 6 below describes a suitable method for copper plating of an activated Raney nickel alloy film on a nickel foil substrate by electrochemical displacement deposition. Preferably, the plating will utilize sufficient copper to incorporate from about 2% to about 70% by weight copper into or on the activated Raney layer, more preferably from about 10% to about 50% by weight copper, and still more preferably from about 15% to about 40% by weight copper.

Typically, some copper plating of the metallic sheet or foil substrate will also normally occur, unless the exposed side of the substrate comprises essentially pure copper, which is acceptable. Copper plating of the surface of the sheet or foil substrate, which is predominantly plating of copper onto copper after the first layer of copper is deposited, is kinetically easier and faster than plating of nickel in the interior of the Raney metal film. Penetration of copper into the interior of the Raney metal film during plating is hindered by diffusion and by the fact that the Raney metal (e.g., nickel) surface is likely oxidized during plating.

Deposition of copper on the exposed side of a metal sheet or foil substrate opposite the Raney catalyst coating or film may be substantially reduced or eliminated by reversibly passivating the exposed side of the substrate prior to copper plating. For example, an insulating layer may be applied onto the exposed side of the substrate and then stripped from the substrate after the copper plating procedure has been completed. In one embodiment, an insulating layer comprising an acrylic polymer is spray-applied to the exposed side of the Raney metal coated substrate and then removed after copper plating, for example, by immersion in a heated bath of xylenes. Example 8 below describes copper plating of an activated Raney nickel alloy film on a nickel foil substrate after first passivating the exposed side of the substrate with an insulating layer. Passivating the exposed side of the substrate prior to copper plating not only conserves copper, but by inhibiting copper from depositing on the exposed side of the substrate is believed to enhance penetration and diffusion of copper from the plating bath into the porous structure of the Raney metal film on the opposite side of the substrate rather than being predominantly deposited on the surface of the Raney metal layer. Moreover, by causing copper to more deeply penetrate into the Raney metal structure, it is believed that this technique of reversibly passivating the exposed side of the sheet or foil substrate may also enhance the adhesion the copper-plated Raney active layer to the substrate surface and provide a more mechanically robust catalyst structure.

Methods for coating monoliths (e.g., the surface of a non-porous sheet or foil or foraminous honeycomb substrate) with a non-metallic, insulating material to serve as a support for a copper-containing catalytic active phase of the alcohol reforming catalyst are well-known in the art. A typical method, used for the preparation of automotive exhaust catalysts, includes providing an alumina washcoat to provide a layer of non-metallic or ceramic support on the surface of a ceramic monolith (e.g., honeycomb) as described by R. M. Heck and R. J. Ferrauto in *Encyclopedia of Catalysis*, vol. 1, I. T. Horvath ed., Wiley, New York, pp. 517-60 (2003). Processes for depositing and incorporating metals such as nickel and copper onto such washcoated substrates to produce the alcohol reforming catalyst in the form of a monolith are widely known by those skilled in the art. While less preferred due to their generally lower thermal conductivity, non-metallic, insulator supported alcohol reforming catalysts have the advantage of being readily incorporated into reformers using these well-known commercial techniques.

F. Reformer Operating Conditions

The temperature of the catalyst and the product alcohol reformate gas mixture or stream may be varied depending on the activity required of the catalyst at any point in time. Preferably, however, the reforming temperature is greater than about 200° C. (below which reforming may be incomplete) and less than about 400° C., since temperatures above this may require more expensive materials of construction. More preferably, the reforming temperature is from about 220° C. to about 350° C. In the case of alcohol reforming catalysts comprising a copper-containing active phase at the surface of a non-metallic supporting structure, the reforming temperature is preferably from about 200° C. to about 220° C. in order to inhibit undesired methanation and maintain selectivity. The temperature of the gas mixture within the reforming reaction zone and the catalyst within the reforming reaction zone are typically approximately the same.

It is preferable to operate the reformer below about 3 atmospheres gauge pressure, primarily because designing the reformer for high pressure operation entails the use of more expensive or heavier materials of construction (e.g., for the shell and thicker, less thermally conductive sheets of metal coated with alcohol reforming catalyst). The exit pressure from the reformer is preferably sufficient to allow for controlled mixing of the reformate gas with air or other oxygen-containing gas in the preparation of the intake gas (e.g., fuel-air) mixture for introduction into the combustion chamber of an internal combustion engine.

In embodiments where the feed gas mixture introduced into the reforming reaction zone of the reformer comprises ethanol, it is preferred that the reforming process proceed according to the low-temperature reaction pathway shown in reaction equations (7) and (5) (after optional water-gas shift if water is present in the ethanol feed). That is, by maintaining the reforming temperature within the preferred range, decomposition of ethanol according to the pathway of reaction equation (1), which is dominant in high-temperature steam-reforming systems, does not appreciably occur. Thus, it is preferred that the product reformate gas mixture produced comprise hydrogen, methane and a carbon oxide component selected from the group consisting of carbon monoxide, carbon dioxide and mixtures thereof. Preferably, the methane and carbon oxide components are present in approximately equimolar amounts in the product reformate gas mixture. Molar ratios of methane to the carbon oxide component of from about 0.9 to about 1.25 are approximately equimolar. Moreover, undesired methanation is preferably minimized. An important advantage of the preferred reforming catalyst comprising a copper-containing active phase at the surface of a nickel sponge supporting structure is that methanation is negligible under the preferred operating conditions of the reformer at reforming temperatures of up to about 400° C.

When the alcohol fuel in the feed gas mixture introduced into the reforming reaction zone comprises ethanol, it is also preferred that the rate of methane production in the product reformate gas mixture be at least about 50% of the ethanol feed rate on a molar basis (i.e., at least about 50% conversion of ethanol to methane is achieved). More preferably, at least about 60% conversion of ethanol to methane is achieved, even more preferably at least about 70% conversion, at least about 80% conversion, at least about 90% conversion, and still more preferably at least about 95% of ethanol in the feed gas mixture is converted to methane in the reformate gas on a molar basis. The product reformate gas mixture preferably comprises not more than about 10 mole % acetaldehyde and not more than about 20 mole % ethanol, more preferably, not more than about 5 mole % acetaldehyde and not more than about 15 mole % ethanol. For catalysts containing a copper-containing active phase at the surface of a metal supporting structure, kinetics are described by Morgenstern et al. in "Low Temperature Reforming of Ethanol over Copper-Plated Raney Nickel: A New Route to Sustainable Hydrogen for Transportation," *Energy and Fuels*, Vol. 19, No. 4, pp. 1708-1716 (2005) as being a function of ethanol feed rate, catalyst loading, and temperature such that reformer conditions can be readily determined and selected based on power system requirements to produce a product reformate gas mixture of the desired composition. Similarly, these parameters can be adjusted accordingly in the case of other reforming catalysts comprising a copper-containing active phase at the surface of a non-metallic supporting structure to produce a product reformate gas mixture of the desired composition.

In another embodiment of the present invention, an alcohol fuel is reformed in a multi-stage reforming process. This concept is particularly suited for stationary applications for the production of hydrogen-containing fuels by reforming of alcohols. In a first low-temperature stage of the process, the ethanol-containing fuel is introduced into a first reforming reaction zone and contacted with a reforming catalyst as described above comprising copper at the surface of a thermally conductive metal supporting structure at a reforming temperature below about 400° C., preferably from about 220° C. to about 350° C., to produce a partially reformed gas mixture comprising hydrogen and methane in accordance with reaction equations (7) and (5) (after optional water-gas shift if water is present in the ethanol feed). The partially reformed gas mixture from the first reforming reaction zone is then introduced into a second reforming reaction zone and contacted with a reforming catalyst to reform methane to hydrogen and carbon monoxide and produce a reformate gas mixture preferably substantially free of methane. Typically, the second reforming reaction zone of the reforming process is a conventional steam reforming stage in accordance with reaction equation (9) and operated at a temperature higher than the temperature maintained in the first reforming stage.

$$CH_4 + H_2O \rightarrow 3H_2 + CO \qquad (9)$$

Catalytic steam reforming of methane and other hydrocarbons is well-known in the art and is typically conducted over nickel-containing catalysts. The reaction is highly endothermic and high temperatures, generally at least about 700° C., are required in order to obtain acceptable conversions in the second reforming reaction zone. High-temperature steam reforming of hydrocarbons as occurs in the second reforming stage is discussed by D. E. Ridler and M. V. Twigg in Catalyst Handbook, 2nd ed., M. V. Twigg ed. Manson Publishing, London, pp. 225-282 (1996), the disclosure of which is incorporated herein by reference.

The overall reforming reaction in the first and second reforming reaction zones is shown in reaction equation (1).

Optionally, a water-gas shift reaction can be employed in such an embodiment resulting in the overall reforming reaction depicted in reaction equation (10).

$$CH_3CH_2OH + 3H_2O \rightarrow 2CO_2 + 6H_2 \qquad (10)$$

This multi-stage reforming embodiment reduces coking that occurs in high-temperature ethanol steam reformers that operate according to reaction equation (1). The coking is believed to be caused by dehydration of ethanol to ethylene that rapidly forms coke. Without being bound to any particular theory, it is believed that if the ethanol fuel is first reformed to carbon monoxide, methane and hydrogen at low temperature according to reaction equation (7) and the methane further reformed to carbon monoxide and hydrogen in a subsequent, higher temperature steam reforming stage according to reaction equation (9), coking can be avoided or substantially reduced. In such a multi-stage ethanol reforming process, high-temperature reformate mixture (or portion thereof) exiting the second reforming reaction zone may be used to supply heat to the low-temperature reformer containing the first reforming reaction zone.

G. Reformed Alcohol Power System Design

The present invention achieves efficient utilization of an alcohol fuel in an internal combustion engine system to produce mechanical and/or electrical power. The internal combustion engine system may produce torque to drive a vehicle or in combination with a generator produce electric power. In one embodiment, a feed gas mixture comprising the alcohol fuel is contacted with an alcohol reforming catalyst as described above (e.g., comprising copper at the surface of a thermally conductive metal supporting structure) in a reforming reaction zone of a reformer and reformed to produce a hydrogen-containing product reformate gas mixture. An intake gas mixture comprising the resulting hydrogen-containing reformate gas mixture and an oxygen-containing gas (e.g., air), optionally along with non-reformed alcohol fuel, is introduced into a combustion chamber (i.e., cylinder) of an internal combustion engine and combusted to generate power and produce an exhaust gas mixture. An exhaust gas effluent comprising the exhaust gas mixture is discharged from the combustion chamber of the engine and brought into thermal contact with the reforming reaction zone to heat the reforming catalyst therein to a temperature sufficient to support the alcohol reforming reaction and produce the product reformate gas mixture.

In comparison with an engine fueled with non-reformed, liquid ethanol, internal combustion engines fueled by the hydrogen-containing gas mixture produced by reforming of the alcohol fuel in accordance with the present invention can be operated with increased compression ratios and leaner air:fuel ratios. Higher compression ratios can be employed because hydrogen, carbon monoxide and methane are far less prone to knock than gasoline. Thus, the engine can be operated more efficiently.

The reformed alcohol power systems of the present invention does not include a fuel cell and the hydrogen-containing reformate gas mixture (after optional water-gas shift if water is present in the alcohol feed) is instead combined with air or other oxygen-containing gas to form the intake gas mixture combusted in the internal combustion engine. In order to maximize the attendant benefits of the hydrogen-containing reformate gas mixture as a fuel for the internal combustion engine, it is preferred that at least about 80% of the hydrogen and other components (e.g., methane in the case of ethanol reforming) obtained in the product reformate gas mixture be introduced into the internal combustion engine. More preferably, at least 90%, at least 95%, or substantially all of the hydrogen and other components obtained in the product reformate gas mixture is utilized as fuel in the internal combustion engine.

Because the power system in accordance with the present invention does not include a fuel cell, it is possible to optionally operate the engine with conventional gasoline instead of an alcohol fuel. This allows vehicles to be fueled by alcohol, where available, and to be fueled with gasoline if an alcohol fueling station is not available. Further, while, as discussed below, the use of reformed alcohols, particularly reformed ethanol, is preferred to the use of liquid, non-reformed alcohols as the primary motor fuel due to improved efficiency and cold start, operation using liquid alcohol fuels in a flex-fuel engine utilizing the Miller or Atkinson cycle may be desired. Use of liquid alcohol fuel such as ethanol, without reforming, offer slightly improved volumetric efficiencies compared to the use of reformed alcohol fuels.

Flexible fuel operation is achieved by use of the Miller or Atkinson cycle, which enables an internal combustion engine of a power system which utilizes a four-stroke power cycle to be operated at reduced compression ratios when gasoline fuel is used and increased compression ratios when an alcohol reformate gas mixture or liquid alcohol fuel is used. The Miller and Atkinson cycles are generally characterized in that they enable the expansion ratio to exceed the compression ratio thereby increasing power system efficiency.

In order to be able to operate on gasoline, reformed alcohol or liquid alcohol fuels, it is necessary to avoid compression ratios that lead to knock. This can be done by operating in the Miller or Atkinson cycle with adjustments to the timing of the intake valve. In the Miller or Atkinson cycle, the intake valve is left in its open position past the end of the intake stroke (bottom dead center in crank angle space). As the piston begins the compression stroke, fuel air mixture is pushed out of the cylinder into the intake manifold through the intake valve. Compression of the gas begins only after the intake valve closes. Thus, when operating on gasoline, it is preferable to close the intake valve at a point that ensures the knock limit is not exceeded. Typically in gasoline blends, especially blends containing 90% by volume gasoline (e.g., E10 or gasoline not diluted by ethanol) the compression ratio should not be higher than about 10, although this depends on the octane rating of the gasoline.

When reformed alcohol, especially reformed ethanol is used as a fuel, the intake valve is preferably closed earlier, enabling a higher compression ratio to be used. A preferred value is above about 12 and, more preferably, at about 14 (used by Hirota et al. for reformed methanol).

When alcohol, especially blends containing at least 85% by volume ethanol (e.g., E85 or E100) is used as a fuel, the intake valve is preferably closed earlier, enabling a higher compression ratio to be used. A preferred value is above about 12 and, more preferably, at about 14 (used by Hirota et al. for reformed methanol).

The expansion ratio is not affected by the valve timing adjustment, thus the system will benefit from the improved efficiencies associated with high expansion ratio when utilizing gasoline and reformed alcohol fuels. However, the increased compression ratio used with reformed alcohol fuel increases the amount of fuel in the cylinder and thus the power.

Preferably, the power system of the present invention is able to control the length of time the intake valve remains in the open position in response to the type of fuel sent to the combustion chamber(s). Fuel sensors (e.g., polarity or electrochemical sensors) located anywhere along the pathway of fuel from the storage tank to the combustion chamber can by used to determine the type of fuel being sent to the combustion chambers and can be of the type and design common to flex fuel vehicles presently in operation.

All internal combustion engines operate with highest efficiency in an optimum range of load and engine speed. Engines operating on hydrogen-rich feeds have relatively wide optima, as shown, for example, in the above-mentioned publications authored by T. Hirota and by Keller et al. In order to obtain the highest efficiency over the complete drive cycle, reformed alcohol power systems in accordance with this invention for vehicular and other applications preferably incorporate technologies well known in the art for maintaining engine speed and load in the optimal range over as much of the drive cycle as possible.

Thus, in one preferred mode of operation, the vehicle drive train comprises a continuously variable transmission or "CVT." Continuously variable transmissions allow, within limits, the ratio of the wheel or drive shaft rotational speed to the engine speed to vary continuously. CVTs improve fuel economy by eliminating torque converter losses associated with conventional transmissions and by allowing the engine to run at its most efficient speed. A particularly preferred embodiment utilizes the Anderson variable transmission, described in U.S. Pat. Nos. 6,575,856 and 6,955,620, the entire contents of which are incorporated herein by reference.

Other techniques, well known in the art, can be used to maintain the internal combustion engine at optimum load per cylinder throughout the drive cycle. One method is to idle some of the cylinders when power demand is low. Another is the use of a hybrid electric drive train, of which there are a number of commercial examples, such as the TOYOTA PRIUS or FORD ESCAPE. One or more electric motors are used to supply supplemental torque when power demand is high. The motors can also be used to generate power via regenerative braking. When power demand is low, excess engine power is used to charge the battery by driving an alternator.

Combustion of the gases produced by alcohol reforming in accordance with embodiments of the present invention, specifically $CH_4$, CO and $H_2$, counteracts the cold start problem that afflicts systems that combust non-reformed alcohol fuel directly. In one preferred embodiment of the present invention, a supply of reformate gas is maintained onboard the vehicle. This onboard supply can be used to fuel the engine at startup and during subsequent operation until the reformer has attained operating temperature and can be used for transient periods of high fuel demand such as acceleration. The fuel is preferably hydrogen or hydrogen-containing alcohol reformate because combustion of these fuels produces a clean exhaust, which is not expected to require a catalytic converter.

An onboard supply of reformate gas may be provided by increasing the size and pressure rating of the reformer and providing inlet and outlet valves such that a quantity of reformate gas is stored within the reformer when the vehicle is shut down. In such a system, a slow methanation reaction may occur in the reformer resulting in the production of a mixture of $CH_4$ and $CO_2$. This configuration also increases the size and weight of the reformer, thereby increasing cost and complicating the task of ensuring efficient thermal contact between the exhaust gas stream and the catalyst bed of the reformer.

It is therefore preferable to provide an onboard reformate storage tank and a small compressor that can be used to shunt a small fraction of the reformate to the storage tank as shown in FIG. 1. The reformate should preferably be stored close to ambient temperature in order to increase the capacity of the storage tank and to improve engine volumetric efficiency resulting from delivery of the reformate to the engine at a higher density. In addition, avoiding excessive temperatures in the storage tank prevents the creation of excess pressure that might cause the vessel to rupture. For these reasons, the storage tank is preferably located in a region of the vehicle where it is exposed to ambient air and maintained at a lower temperature such as outside the engine compartment. The storage tank may be equipped with a reliable pressure relief device as an additional safety feature.

As an alternative to onboard storage of reformate, the catalyst bed in the reformer can be preheated to the temperature necessary to maintain the reforming reaction by electric or thermal-chemical source.

Figure 2:
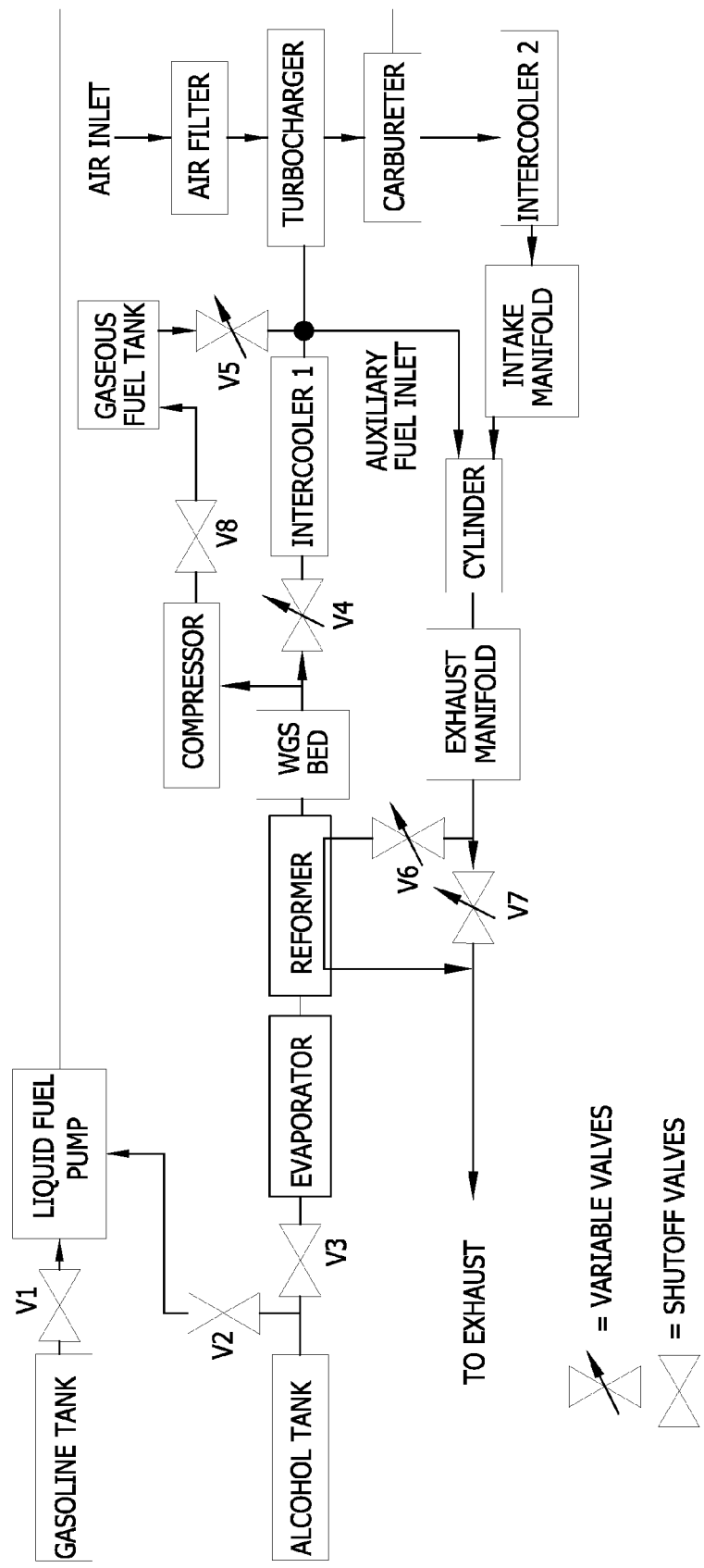
FIG. 2 is a schematic of a reformed alcohol power system suitable for vehicular applications.

FIG. 2 is a schematic of one embodiment of a reformed alcohol power system in accordance with the present invention suitable for use in vehicular applications. In a preferred embodiment, a turbocharger or supercharger is employed to pressurize the mixture of air and reformed alcohol fed to the engine and the fuel-air mixture is passed through an intercooler (referred to as Intercooler 2 in FIG. 2) to reduce its temperature prior to introduction into the cylinder of the engine. It is preferred to compress the mixture, rather than just air as is conventional for liquid fuels, because this enables the reformer to be operated close to atmospheric pressure and improves fuel-air mixing. The use of compressed fuel-air mixtures as a feed to the engine increases the maximum power available from the engine. It is further preferred to use a separate intercooler (Intercooler 1 in FIG. 2) to cool the alcohol reformate prior to blending with air. Cooling of the alcohol reformate can be accomplished more efficiently than cooling of a reformate-air mixture owing to the higher temperature of the reformate. In a preferred embodiment of the present invention, the alcohol feed is used to cool the alcohol reformate in Intercooler 1.

As discussed above, the intake valve is preferably left open until shortly after the beginning of the compression stroke in the cylinder, which has the effect of pushing some of the fuel-air charge back into the intake manifold. This mode of operation, known as the Miller cycle, is preferred for two reasons. First, gaseous fuels displace volume that might otherwise be occupied by air if a liquid fuel were employed. When maximum power is required from the engine, the usual practice is to employ a roughly stoichiometric air:fuel ratio. When using gaseous fuels such as an alcohol reformate, pressurization of the charge is required in order to obtain peak power similar to that of a liquid-fueled engine. The second reason is that, without the intercooler, the fuel-air charge would be hot due to the heat introduced during reforming of the alcohol and turbocharging of the air. The hot charge is more prone to detonate prematurely. Operation without the turbocharger (the Atkinson cycle) or without delayed closing of the intake valve are further embodiments of the invention, but the former sacrifices some peak power and the latter some efficiency in comparison to the Miller cycle. Both the Miller and the Atkinson cycle improve efficiency at part load by eliminating throttling losses.

An important advantage of the Miller and Atkinson cycles is that they enable the engine to be run on conventional gasoline without knock. Typical gasoline formulations will knock at compression ratios above 10, but it is preferable to operate ethanol reformate and liquid ethanol fuel at higher compression ratios in order to improve efficiency. Thus, when gasoline is being used to fuel the engine, it is preferred to leave the intake valve open longer after the beginning of the compression stroke in order to reduce the compression ratio to a suitable value for gasoline.

In a preferred embodiment, a power system configured to operate on liquid alcohol fuel, reformed alcohol fuel and mixtures thereof is provided. The system would include a reformer smaller in size than a reformer used in a system which generated power from reformed alcohol alone. In embodiments where ethanol is the reformed fuel, the system would typically run on reformed ethanol at startup and at points in the drive cycle near about 1500 rpm. When higher power is required from the engine, the system would run on non-reformed fuel. This system design has several advantages over other designs, namely the decreased capital cost of the smaller reformer, decreased time for the reformer to achieve operating temperatures sufficient to maintain the reforming reaction and the ability to achieve high volumetric efficiency without the need to turbocharge. Improved volumetric efficiency also allows for a smaller size of the internal combustion engine. For example, in accordance with one preferred embodiment of the present invention wherein the intake gas mixture comprises ethanol reformate comprising hydrogen and methane and the non-reformed ethanol fuel, the molar ratio of ethanol to methane in the intake gas mixture is at least about 10 and in another preferred embodiment, the molar ratio of ethanol to methane in the intake gas mixture is less than about 0.4.

In one preferred embodiment, the engine is spark-ignited. The use of spark ignition provides more consistent and reliable combustion, particularly when using gasoline as a fuel, and allows engine timing to be adjusted as the fuel is varied.

In a preferred embodiment, jet ignition is utilized in order to enable reliable ignition and complete combustion to be achieved using reformed ethanol fuel at lean air:fuel ratios. Such systems are well known in the art as a technique to extend the engine's lean stable operating limit and are discussed by Heywood in *Internal Combustion Engine Fundamentals* (McGraw Hill, New York, 1988) on pages 447-50. Ignition occurs in a prechamber cavity, containing the spark source, which is in fluid communication with the rest of the cylinder (i.e., to the main combustion chamber) through an orifice or nozzle. A particularly preferred embodiment enriches the prechamber with alcohol reformate when the engine is operating on a reformed alcohol fuel.

Figure 3:
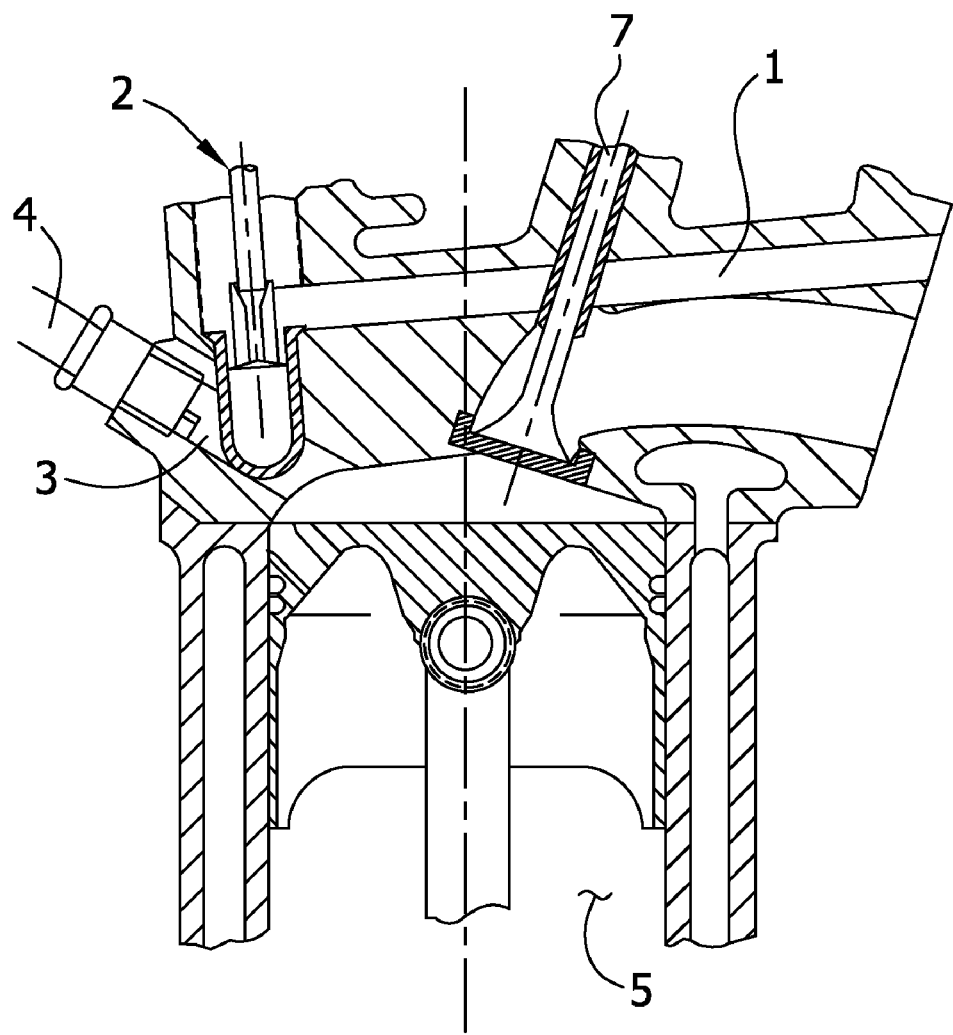
FIG. 3 is fragmentary cross-section of a flame jet ignition system used in the reformed alcohol power system.

An example of a flame jet ignition system wherein the prechamber gas mixture and combustion chamber intake gas mixture are both supplied from portions of the product reformate gas mixture is illustrated in FIG. 3. The product reformate gas mixture is produced upstream of the ignition system by contacting a feed gas mixture comprising an alcohol fuel with a reforming catalyst (e.g., catalysts as described above comprising a copper-containing active phase at the surface of a ceramic or non-metallic support, preferably a metal sponge supporting structure) in a reformer reaction zone.

With reference to FIG. 3, an auxiliary intake passage 1 connects the exit of the reformer to an auxiliary intake valve 2, which is connected to the prechamber 3 equipped with a spark plug 4. The prechamber 3 is in fluid communication with the main combustion chamber 5. During intake, the auxiliary intake valve 2 is opened, causing an intake gas mixture comprising oxygen and a portion of the product reformate gas mixture to pass through the prechamber 3 and into the main chamber 5. This results in purging of the prechamber. The product reformate gas mixture may, alternatively, be fed to the main chamber 5 through intake valve 7. The auxiliary valve 2 (and intake valve 7 if used) is closed before the beginning of the compression stroke. During compression, the lean alcohol reformate gas mixture in the main combustion chamber 5 of the cylinder is forced into the prechamber and preferably bringing the prechamber composition to a composition slightly rich of stoichiometry at the time of the spark discharge. The flame which develops in the prechamber 3 after discharge causes a rise in pressure that, in turn, forces one or more hydrogen-rich flame jets into the main chamber 5, ensuring rapid and complete combustion of the intake gas mixture therein.

In an especially preferred embodiment, the prechamber gas mixture comprises ethanol reformate containing hydrogen and methane and the intake gas mixture comprises oxygen and fuel. A variety of fuels may be selected for use in the intake gas mixture, including, for example, alcohol reformate compositions, non-reformed liquid alcohol, liquid alcohol/water blends (e.g., E10 or E85) and gasoline. In embodiments where the fuel used in the intake gas mixture is different from the prechamber gas mixture (i.e., is other than ethanol reformate), it is preferred that the intake gas mixture be delivered to the main chamber 5 through intake valve 7 rather than auxiliary intake valve 2.

Fueling of the jet ignition system with liquid fuels, such as ethanol and gasoline, is also feasible, but in that case, the liquid fuel is preferably supplied to the prechamber via a fuel injector.

Figure 4:
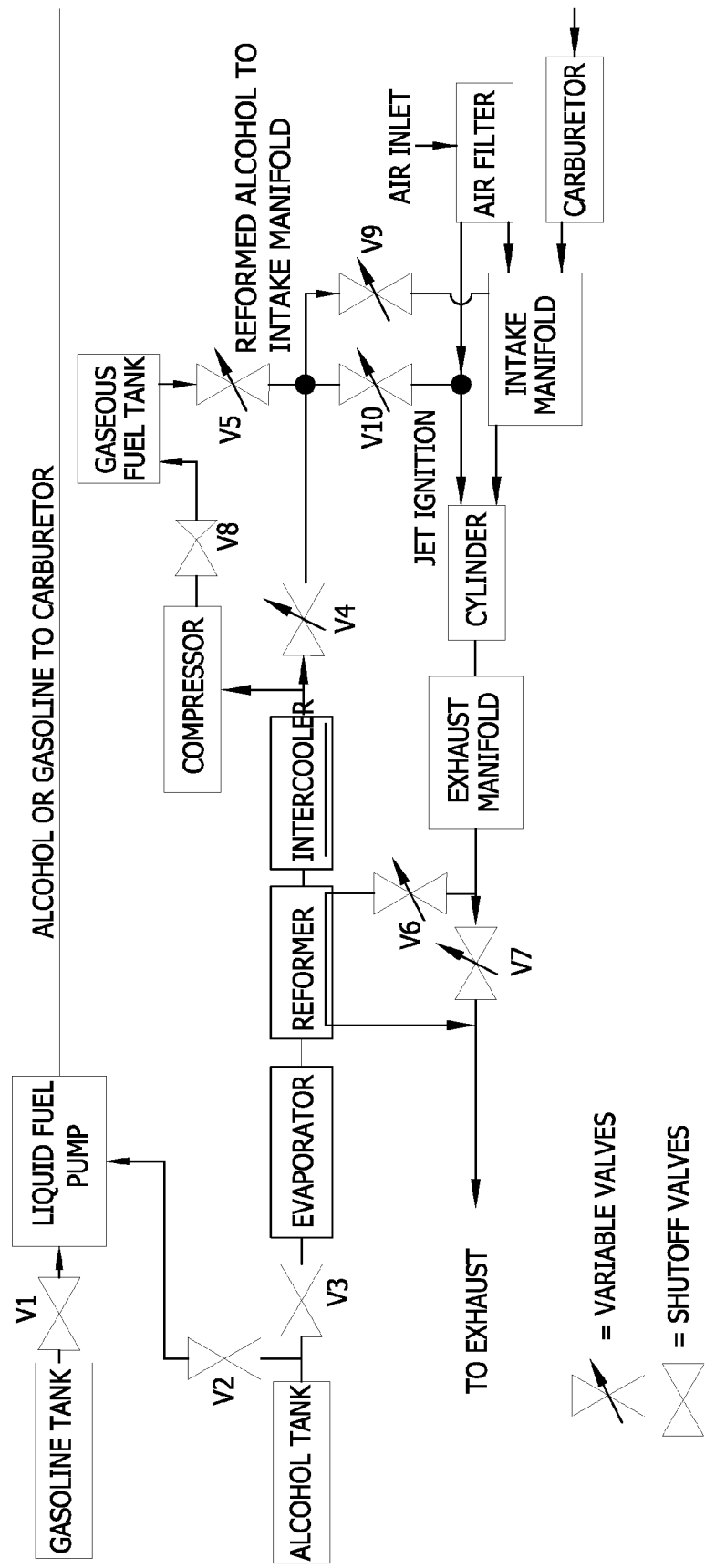
FIG. 4 is a schematic of a reformed alcohol power system which utilizes jet ignition suitable for vehicular applications.

FIG. 4 depicts a reformed alcohol power system utilizing jet ignition. A water-gas shift bed is not included as in the power system depicted in FIG. 2 as it is assumed the vehicle operates on ethanol with a low water content and there is no turbocharger. The flow of reformate to the jet and the intake manifold is controlled with variable valves 9, 10. The remainder of the system operates in accordance with the system shown in FIG. 2 and described herein.

As jet ignition enables lean combustion of alcohols, it is particularly useful in a power system configured to operate on both liquid alcohol fuel and a reformed alcohol fuel and which employ a reformer smaller in size than a reformer of a system which generates power from reformed alcohol alone as described above. K. Wakai et al. in *Effect of Small Hydrogen Jet Flame on Augmentation of Lean Combustion*, SAE Paper 931943, 1993, demonstrate the use of hydrogen jet ignition to maintain reliable combustion of methanol under very lean conditions, for example, with a $\phi$ equal to about 0.5. Hydrogen jets with a $\phi$ equal to 0.5, 1.0 and 2.0 were generated by igniting the $H_2$—$O_2$ mixture in a prechamber with a volume 1% of the main chamber volume. K. Wakai et al. report that the hydrogen jet igniter reliably ignites the very lean mixture and results in faster and more complete combustion.

To achieve the same effect with an ethanol reformate system, a larger prechamber is required due to the significantly slower flame speed. Honda's Compound Vortex Controlled Combustion (CVCC) engine used jet ignition with larger prechambers and a relatively fuel-rich gasoline-air mixture. T. Date et al. report the use of prechambers with a volume of 4%, 7.3% and 16% of the total combustion volume in *Research and Development of the Honda CVCC Engine*, SAE paper 740605, 1974. According to the authors the optimum ratio of fuel to the prechamber to total fuel is 40% at idle and 25% at 50 mph.

Thus, reformate supplied through the prechamber is preferably from about 5 to about 20% of the fuel value at high load. This results in improved volumetric efficiency as compared to a power system where all of the fuel is reformed. At lower loads the reformer can supply a higher faction of the fuel.

The remainder of the fuel input would be composed of a liquid fuel, preferably an alcohol and most preferably ethanol. The liquid fuel is introduced through the intake manifold with use of a carburetor rather than fuel injection, as this enables use of the Atkinson cycle and provides the flexibility to use either gasoline or ethanol as liquid fuel.

In accordance with one preferred embodiment, reformed ethanol, in addition to being used for jet ignition, is added to the intake manifold. According to E. J. Tully et al. in *Lean-Burn Characteristics of a Gasoline Engine Enriched with Hydrogen from a Plamatron Fuel Reformer*, SAE paper 2003-01-630, 2003 and Z. Ivanič et al. in *Effect of Hydrogen Enhancement on Efficiency and $No_x$ Emissions of Lean and EGR-Diluted Mixtures in an SI Engine*, SAE paper 2005-01-0253, 2005, mixtures of gasoline and 15-30% reformed gasoline ($CO$, $H_2$, and $N_2$) with normal ignition are known to burn leaner with higher efficiency than ordinary gasoline. Similar efficiency gains are expected in the case of ethanol. One skilled in the art can experimentally optimize the split between reformed ethanol to the jet and to the intake manifold over the speed and load map.

In another preferred embodiment, the fuel-air mixture is subjected to stratified charge combustion. In a further preferred embodiment, the fuel-air mixture is not spark ignited, but rather ignition is achieved by the use of Homogeneous Charge Compression Ignition (HCCI) as described, for example, by A. O. zur Loye et al. in U.S. Pat. No. 6,915,776. HCCI is well known in the art as a method for utilizing well-mixed fuel-air mixtures, such as those produced in the practice of the present invention. High thermal efficiency can be achieved by the use of HCCI with proper control of operational variables such as equivalence ratio, as set forth by zur Loye et al.

H. Fuel System Operation

1. Normal Operation

Referring again to FIG. 2, a preferred configuration in accordance with the present invention is illustrated. If the ambient temperature is high enough for adequate volatilization of the alcohol fuel (e.g., above about 15° C. for ethanol), then the power system is started similarly as in a conventional vehicle. Valves V3, V4, V5, V7 and V8 are closed and valve V6 is fully open. If the vehicle is operating on alcohol fuel, then valve V1 is closed, valve V2 is open, and alcohol is supplied to the carburetor using the liquid fuel pump. If gasoline is to be used at startup, valve V1 is open and valve V2 is closed, and gasoline is supplied to the carburetor using the liquid fuel pump. The power system of FIG. 2 can be designed without a source of gasoline without departing from the scope of the present invention.

Regardless of whether alcohol fuel or gasoline is used at startup, the exhaust from the engine is forced through the reformer to heat it to the desired operating temperature as quickly as possible. When the operating temperature is reached, variable valves V6 and V7 are adjusted accordingly in order to regulate the flow of exhaust gases through the reformer body and maintain the desired operating temperature in the reforming reaction zone contained therein.

2. Startup at Low Ambient Temperatures

When the ambient temperature is too low to reliably start the engine, then the engine is started with valves V1, V2, V3, V4, V7 and V8 closed and valve V6 fully open. Gaseous fuel from the gaseous fuel tank is metered using valve V5, blended with air and used as the starting fuel. Shortly after the engine has been started, liquid fuel (gasoline or alcohol) is supplied to the carburetor, valve V5 is closed, and normal startup is resumed.

3. Steady State Operation on Reformed Alcohol Fuel

Once the reformer has reached operating temperature, valve V3 is opened (valve V4 remains closed) and alcohol is pumped into the reformer using the reformer pump (not shown). When the pressure in the reformer reaches the design value, the reformed alcohol gas mixture valve V4 is partially opened and, from then on, variable valve V4 is used to meter the reformate gas into the fuel intake system. At this time, the liquid fuel pump is shut off, valves V1 and V2 are closed, and the reformer pump is controlled to maintain the desired pressure in the reformer. As shown in FIG. 2, the reformed alcohol gas mixture is passed through a water gas-shift stage containing a suitable catalyst (WGS bed) before the reformate gas is introduced into the fuel intake system. The optional water-gas shift catalyst bed may be omitted if desired, for example when the alcohol fuel comprises anhydrous ethanol.

Optionally, during steady state operation, some of the reformed gas may be used to recharge the gaseous fuel tank using the compressor and opening valve V8. If operated in this manner, it is preferable to use an alcohol fuel containing less than one mole of water per mole of alcohol to avoid condensation of water in the gaseous fuel tank.

4. Idle Operation on Reformed Alcohol Fuel

Figure 7:
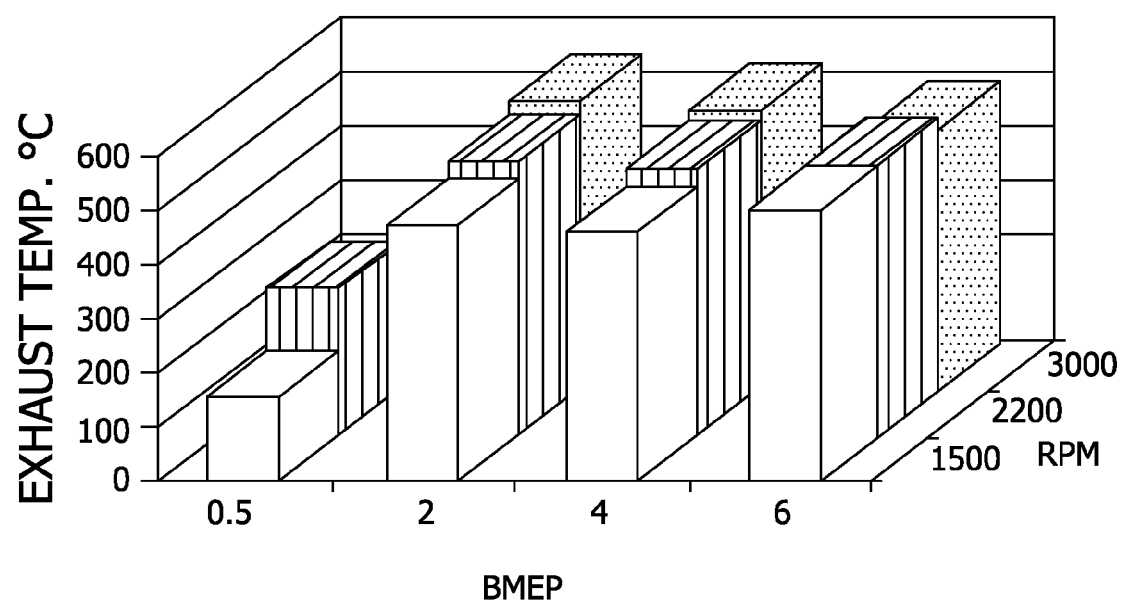
FIG. 7 is a graphical depiction of predicted exhaust temperatures for an ethanol reformate internal combustion engine power system as simulated in Example 11.

As can be see from FIG. 7, predicted engine exhaust temperatures at low idle are less than those at greater power demand. Thus it may be desirable for the engine exhaust to bypass thermal contact with the reformer at idle conditions so as to not cool the catalyst bed. According to one preferred embodiment, V6 is closed and V7 opened during idle conditions such that the exhaust by-passes the reformer.

5. Steady State Operation on Gasoline

If the alcohol fuel tank is empty, the system continues to operate fueled by gasoline supplied by the gasoline pump to the carburetor.

It will be appreciated by one skilled in the art that the present invention can be used in conjunction with a wide range of engine and drive train technology beyond that which has been described. For example, the use of rotary engines, direct injection of alcohol or gasoline into the cylinders, the induction of swirl in the cylinder to improve speed of combustion, and the use of other engine cycles, such as the Westport cycle are all feasible using alcohols reformed in accordance with the present invention.

While it is preferred that the reformed alcohol system design and operation of the fuel system be performed with alcohol reforming catalysts described herein, such designs and operations are not limited to such catalysts and are compatible with other reforming catalysts.

The following examples are simply intended to further illustrate and explain the present invention. This invention, therefore, should not be limited to any of the details in these examples.

EXAMPLE 1

Copper Plating of a Stainless Steel Preheater for Ethanol Reforming

This Example describes copper plating of a preheater used to heat an ethanol stream upstream of the catalyst bed in order to suppress side reactions catalyzed by the steel. The preheater consists of a vertically-mounted length of 316 stainless steel tubing (½" o.d. (1.27 cm), ⅜" i.d. (0.95 cm)) heated with a coil heater. In operation, ethanol is pumped through a tube (⅛" o.d. (0.32 cm)) also wrapped around the heater. The ethanol then passes upward through the preheater. The heater is controlled with a temperature controller which senses the temperature of gas exiting the preheater.

The copper plating was applied to a 316 SS preheater tube (100 g) using a peristaltic pump to circulate a simple copper-plating bath through it. The bath was composed of $CuCl_2$ (5.37 g) acidified with concentrated HCl (15 g) in deionized water (135 g) in order to remove oxides and allow the entire interior surface of the tube to be plated. The bath contained a total of 2 g of copper metal. The mixture was circulated through the bath for two hours. The blue color faded and was replaced by deep green, likely due to nickel displaced by copper. A rough, but uniform copper deposit was seen inside the tube.

EXAMPLE 2

Scaled Up Copper Plating of Nickel Sponge with Drying

This example demonstrates that copper plating of a nickel sponge support by electrochemical displacement deposition can be effectively conducted at high solids loading. The use of high solids loading reduces the cost of catalyst production by improving the productivity of the process and reducing the volume of wastewater. In order to further reduce cost, the amount of copper used in the second (acidic) step of the plating process has been decreased from 25% to 10% of the nickel sponge substrate mass.

The amount of NaOH used was reduced from 1.5 equivalents to 1.0 equivalents (based on the amount copper in the plating bath). Enough gluconic acid buffer was used to supply the protons required to disproportionate the $Cu_2O$ formed in the first step:

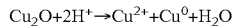

This example further shows that the copper-plated nickel sponge catalyst can be dried and safely handled thereafter. When dry, the catalyst does not exhibit pyrophoric behavior. Use of a dust mask in handling dry catalyst is recommended.

Raney nickel powder (673 g, grade 4200) was weighed out by Archimedes' method in a 4-liter beaker using a density factor of 1.16. In the first step of the plating process, $CuSO_4.5H_2O$ (661 g, 25% by weight copper with respect to substrate; mixture of material from VWR and Mallinckrodt) and Versene 100 (2911 g, 1.1 equiv. of $Na_4EDTA$, Dow via Spectrum) were combined and stirred to dissolve the copper sulfate. The supernatant was decanted from the Raney nickel and the copper-EDTA mixture added. Next, 50% NaOH (212 g, 1.0 equiv.) was added dropwise over 38 minutes while stirring with an overhead stirrer. The pH rose from 9.1 to 11.6. At the end of the addition, the slurry occupied 3.4 liters for a substrate weight:volume ratio of 19.8%.

The deep blue supernatant was decanted and the beaker wrapped with heating tape. In the second step of the plating process, 50% gluconic acid (1038 g, 1.0 equiv with respect to copper added in the first step, Spectrum) and water (1 liter), both heated, were added to the beaker and stirring initiated. A solution of $CuSO_4.5H_2O$ (264 g, 10% by weight copper with respect to substrate) in water (1 liter) was added dropwise over 82 minutes with continuous stirring and heating. The pH fell from 3.3 to 2.4. The initial and final temperatures were 56° C. and 70° C., respectively. The final volume was 3.4 liters, matching that in the first step.

The blue-green supernatant was decanted and the catalyst rinsed twice with deionized water. The rinse was conducted by adding water to a slurry volume of 3.4 liters, stirring briefly, and then settling the catalyst and decanting the supernatant. The second rinse had a pH of 4.0 and was clear. The catalyst was initially a bright copper color, but partially darkened to a copper brown color during the decantation.

The catalyst was then transferred to an 800 ml beaker where it occupied 350 ml. It was dried overnight at 120° C. under 24" Hg (610 mm Hg) vacuum with nitrogen purge. The copper-colored catalyst was transferred in air to a bottle. Some heating occurred and a few sparks were observed. 679 g of catalyst were recovered.

In order to allow the catalyst surface to be passivated by oxygen in a controlled way without overheating, the bottle of catalyst was evacuated, backfilled with argon and loosely capped. The catalyst bottle was placed in a beaker of water to cool the bottle as air slowly entered the catalyst bottle. The catalyst color dulled slightly. After half an hour, the bottle was removed from the water bath. The cap was left loose for another hour, but no heating was observed, so the bottle was capped for storage. No heating or further change in catalyst color was observed when the catalyst was stored in air at room temperature.

Elemental analysis of the dried catalyst by Inductively Coupled Plasma Mass Spectrometry (ICP-MS) determined that its composition to be: 67.8% Ni, 29.6% Cu, and 2.7% Al. The dried catalyst packed at a density of 1.8 $g/cm^3$.

EXAMPLE 3

Ethanol Reforming with and without a Copper Plated Preheater

Anhydrous ethanol was reformed over dry copper-plated Raney nickel (2.5 g) produced by the process of Example 2 at 280° C. at a feed rate of 0.07 ml/min. The preheater used upstream of the catalyst bed was not copper plated. Coking caused backpressure to develop in the preheater, forcing the experiment to be terminated after 36 hours.

The plugged preheater was replaced by a copper-plated stainless steel tube prepared by the process of Example 1. Anhydrous ethanol was reformed for 118 hours with the same catalyst at a temperature of 280° C. at a flow rate of 0.07 ml/min. The catalyst was not replaced. Coking was not observed. Pressure remained below 3 psig (144 mm Hg gauge) Ethanol breakthrough rose from 4% to 16% over the first 75 hours and then leveled off.

EXAMPLE 4

E85 Reforming with a Copper Plated Preheater

The experiment in Example 3 was conducted but the feed was changed to a simulated E85 fuel. The E85 simulant was a mixture of 85% absolute ethanol and 15% n-pentane on a volume basis (8.2% pentane on a molar basis). Pentane passed through the reformer without reaction. No new peaks were seen by gas chromatography and the exit concentration of pentane was 8%, indicating that pentane was not consumed. The experiment was continued to a total run time of 125 hours (200 total hours with 75 hours being the copper-plated run of Example 3). Pressure remained below 3 psig (155 mm Hg gauge) and slow deactivation continued with ethanol breakthrough reaching about 21% at the end of the run.

EXAMPLE 5

Activation of a Raney Nickel Alloy Film

This example describes the activation of a film of Raney nickel alloy (50% aluminum, 50% nickel) coated on a 38 μm nickel foil (CERAM, Stoke-on-Trent, Great Britain). The nominal loading of Raney nickel alloy on the foil was 0.070 g/cm². The Raney nickel alloy-coated foils were 12 cm in width and cut to 30-40 cm lengths. The preparation of the Raney alloy-coated metal foils is described by P. Haselgrove and N. J. E. Adkins in Ceramic Forum International cfi\Ber. DKG 82 (2005) No. 11 E43-45.

The activation was conducted in a glass developing tank (7 cm×27.5 cm in cross section) for thin layer chromatography. To avoid the necessity of bending the Raney nickel alloy-coated foil, a piece (31 cm long and 12 cm wide) was cut in two (17 cm×12 cm and 14 cm×12 cm) and the two pieces placed in the glass developing tank. The initial weight of the Raney nickel alloy-coated foil was 38.76 g. The total quantity of Raney alloy on the foil was calculated to be 26 g. Ice (1100 g) was added to the tank followed by 50% NaOH (400 g). Water (1200 ml) was added to raise the water level above the top of the film.

The foil was kept in the tank for six hours during which the bath warmed to room temperature and hydrogen evolution was steady. The color of the Raney nickel alloy film darkened conspicuously. After the six hours lapsed, the liquid was drained from the tank and replaced by water (approximately 2 liters at 85° C.) which promoted bubbling despite the absence of base, followed immediately by the addition of 50% NaOH (200 g). Gas evolution increased dramatically after base addition, but there was no foaming. Gradually, gas evolution decreased. After 20 minutes, additional 50% NaOH (600 g) was added to the tank. This led to an increase in hydrogen evolution similar to that which occurred during the first base addition. An hour after the first base addition, hydrogen evolution had slowed to a low rate. The films were flexible.

The glass tank was then drained and the activated foils rinsed twice in the tank with deionized (DI) water. The smaller of the two pieces of foil was rinsed extensively under a deionized water tap and cut into two pieces. One piece was stored in a glass jar under water and the other dried overnight at 120° C. under 24" Hg (610 mm Hg) vacuum with nitrogen purge. The larger of the original two pieces of foil was used for copper plating in Example 6.

Activated catalyst scraped from the foil had the following normalized metal content as determined by ICP-MS: 90.5% Ni, 9.4% Al and 0.16% Fe. The activation of the Raney nickel alloy-coated foils and observations are summarized in Table 1 below.

TABLE 1

| Time (min) | Temp (° C.) | Notes |
| --- | --- | --- |
| 0 | −4 | Time zero is the time of addition of NaOH and water |
| 1 | +8 | Slow bubbling |
| 2 | +11 | |
| 15 | +9 | |
| 40 | +5 | Ice melted, bubbling primarily from bottom of films |
| 60 | +5 | Bubbling accelerating |
| 105 | +7 | Bubbling still vigorous |
| 165 | +11 | Bubble-rich zone about 4 cm from bottom of the films |
| 300 | +21 | Still bubbling, foils still stiff, alloy surface is dark |
| 360 | +20→85 | Liquid drained and hot dilute NaOH added, vigorous $H_2$ evolution, declining somewhat over time |
| 380 | 75 | 600 g of 50% NaOH added, $H_2$ evolution increases |
| 420 | 58 | Bubbling almost over, films are flexible, tank drained |

EXAMPLE 6

Copper Plating of Activated Raney Nickel Alloy Film on Nickel Foil

This example describes the copper plating of the activated Raney nickel alloy film on nickel foil prepared in Example 5. The larger piece of the activated foil (17 cm×12 cm) was rinsed under the deionized water tap and transferred to a 1 liter beaker. It was then completely submerged in deionized water to protect it from air and held overnight.

In order to avoid damaging the foil, a magnetic stirrer (Ikamag REO) was used instead of an overhead stirrer. The stir bar was weakly attracted to the film due to the ferromagnetism of nickel, but the stirrer had a magnet sufficiently powerful to keep the stir bar in the center of the beaker, while the foil was coiled to conform roughly to the beaker wall with the Raney surface facing inward.

$CuSO_4.5H_2O$ (6.21 g, 20% by weight copper with respect to the activated Raney film as calculated above), Versene 100 (27.4 g, 1.1 equivalents of $Na_4EDTA$ based on copper in the plating bath) and deionized water (700 ml) were combined and sparged with nitrogen. The beaker containing the foil was drained and the copper solution added immediately. The beaker was topped off with deionized water (about 200 ml, not nitrogen-sparged) in order to completely submerge the foil. 2.5N NaOH (15 ml, 1.5 equivalents) was added dropwise while stirring for 48 minutes. The pH rose from 11.7 to 12.7. The activated side of the foil acquired a rich copper color. The blue supernatant was decanted and the beaker wrapped with heating tape.

$CuSO_4.5H_2O$ (7.76 g, 25% by weight copper with respect to the activated Raney film) was dissolved in water (100 ml) and added to the dropping funnel. A hot mixture of 50% gluconic acid (37 g, 3 equivalents), 2.5N NaOH (12 ml) and water (400 ml) was added to cover the foil (about 500 ml). The mixture was nitrogen-sparged. The initial temperature was 45° C. and the initial pH was 3.3. Power was applied to the heating tape, and the copper solution added dropwise over 70 minutes while stirring. The solution grew an increasingly deep green. The final pH was 3.2 and the final temperature was 71° C. The green supernatant was decanted and the bright copper-colored foil rinsed and stored in deionized water. The back (foil) side also was copper-plated.

Catalyst scraped from the foil had the following normalized metal content as determined by ICP-MS: 48.4% Ni, 47.0% Cu, 4.50% Al and 0.11% Fe. Based on elemental analysis data, the foil comprised about 0.046 g/cm² of activated catalyst.

EXAMPLE 7

Ethanol Reforming Using Copper-Plated Raney Nickel Alloy Film on Nickel Foil

Figure 5:
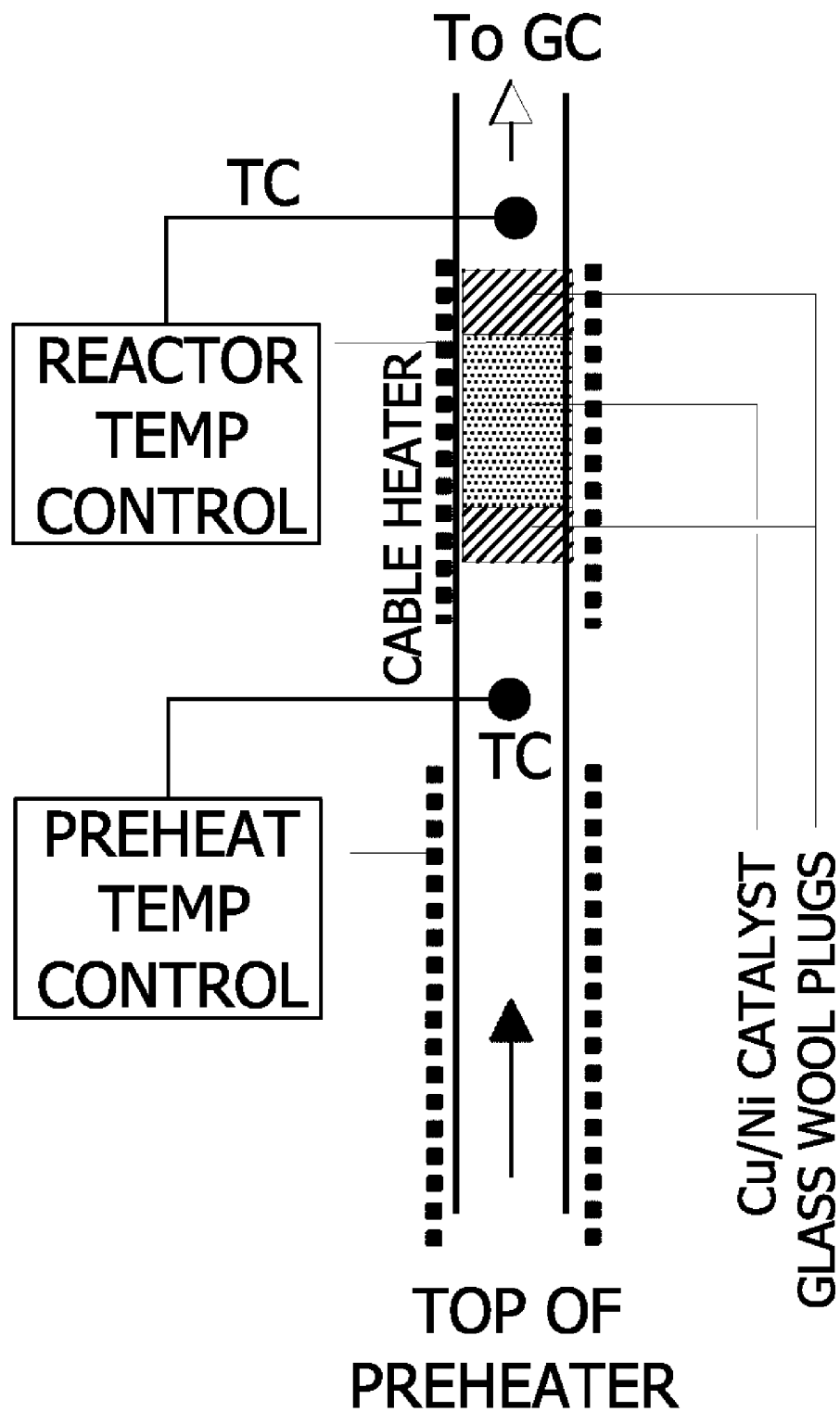
FIG. 5 is a schematic of the reformer used in the ethanol reforming activity study in Example 7.

This example describes testing of the copper-plated Raney nickel alloy film catalyst on nickel foil prepared in Example 6 for ethanol reforming activity. A schematic of the reforming apparatus used for activity testing is shown in FIG. 5 and described by Morgenstern et al. in "Low Temperature Reforming of Ethanol over Copper-Plated Raney Nickel: A New Route to Sustainable Hydrogen for Transportation," *Energy and Fuels*, Vol. 19, No. 4, pp. 1708-1716 (2005).

A rectangle (11 cm×6 cm, 5.99 g wet) was cut from the center of the copper-plated foil prepared in Example 6 and the uncoated edges were trimmed off. The rectangle was coiled tightly lengthwise (i.e., to make a cylinder 6 cm long) and inserted into the reforming tube having an inside diameter of 0.375 in. (9.5 mm) of the apparatus with the catalyst side facing inward. The coil fit easily in the tube and around the 0.125 in. (3.2 mm) thermocouple located in the center of the tube. The thermocouple did not extend the full 6 cm, so the open space was partially filled with a 0.125-inch (3.2 mm) diameter stainless steel rod. The reformer was connected to the preheater and flushed with nitrogen overnight.

The reformer was brought to temperature under nitrogen flow prior to beginning the ethanol-water feed. A mixture of 70% ethanol in water (mole $H_2O$:mole ethanol=1.1) was used as the feed solution and prepared by adding water to 200 proof ethanol (available from Aaper, Shelbyville, Ky.). The ethanol-water feed solution was delivered to the reformer with an Isco 500D syringe pump.

The catalyst was maintained under substantially isothermal conditions (within 1° C.) by the use of two heaters. The ethanol-water feed flowed upward through a preheater, which was controlled to maintain the feed temperature at the entrance to the catalyst bed at the desired value. A cable heater, aligned with the catalyst bed, supplied the heat of reaction and kept the exit temperature equal to the inlet temperature of the catalyst bed.

A six-port Valco valve was used to direct samples of the reformer effluent to the injection port of a gas chromatograph (Varian 3400 GC) equipped with a thermal conductivity detector. A 10 ft.×0.125 in.×0.085 in. (3.05 m×3.2 mm×2.2 mm) Hayesep D packed column (Alltech) was used.

The flowrate and temperature were varied for the first 30 hours until an operating point of 0.1 ml/min (corresponding to 1.318 mmoles of ethanol/min) and 320° C. was chosen. Under these conditions, about 10% ethanol remained unreacted, allowing us to monitor deactivation of the catalyst. There was evidence of some methanation, likely catalyzed by the exposed nickel on the side of the foil opposite the catalyst. In an automotive reformer, the exposed nickel on the back of the foil would not be in contact with the ethanol feed mixture (it would be in contact with the exhaust), so this observation is not a concern.

After about 100 hours on stream, pressure began to increase and the experiment was terminated. Prior to this time, the inlet pressure had been less than 3 psig (155 mm Hg gauge). The pressure rise was the result of some catalyst particles detaching from the foil and creating a partial blockage downstream.

The yield of the low-temperature reforming products during the period when the reformer was operated at 320° C. with a feed rate of 0.1 ml/min and the pressure below 3 psig are set forth in Table 2 below. Conversion was steady, indicating that the catalyst was stable.

TABLE 2

Yield of Low-Temperature Reforming Products During Ethanol Reforming at 320° C., 0.1 ml/min of 70% Ethanol Feed Mixture

| Hours | $CH_4$ | CO | $CO_2$ | $CH_3CHO$ | $CH_3CH_2OH$ |
|---|---|---|---|---|---|
| 30 | 94.6% | 53.7% | 22.6% | 7.9% | 6.6% |
| 40 | 103.5% | 53.7% | 25.7% | 2.4% | 6.2% |
| 50 | 103.4% | 46.0% | 24.9% | 2.6% | 10.2% |
| 60 | 110.0% | 39.1% | 32.8% | 1.8% | 7.3% |
| 70 | 110.5% | 39.6% | 29.9% | 1.6% | 8.4% |
| 80 | 111.6% | 31.8% | 38.7% | 1.4% | 7.6% |

Note that methane yields and mass balances based on methane can exceed 100% due to analytical uncertainties and the methanation of CO by reaction with hydrogen to produce methane and water. Note also that the hydrogen yield is omitted from the Table 2. Although hydrogen was measured directly in the gas chromatograph, thermal conductivity detectors exhibit low sensitivity for hydrogen compared to carbon-containing molecules resulting in more scatter in the data. Accordingly, hydrogen yield can be calculated more accurately from the yield of carbon-containing compounds such as carbon monoxide, carbon dioxide and methane.

EXAMPLE 8

Copper Plating of Activated Raney Nickel Alloy Film on Nickel Foil Utilizing Reversible Passivation of the Back of the Foil Electron microscopy of the copper-plated Raney nickel alloy film catalyst on nickel foil prepared in Example 6 revealed that copper plated heavily onto the back of the foil (i.e., on the side opposite the Raney nickel catalyst), but copper penetrated less than about 10 μm into the Raney nickel film layer. Nickel can easily be oxidatively removed from the interior of the Raney nickel film, but copper plating of the foil surface, which is predominantly plating of copper onto copper, is faster than plating of the interior of the Raney nickel film. Penetration of copper plating is hindered by diffusion and by the fact that the nickel surface is likely oxidized during plating.

In this Example, copper plating on the back of the foil was eliminated by coating it with an insulating layer of an acrylic polymer. The polymer layer was then stripped after the copper plating procedure had been completed. The insulating layer was applied using Sprayon S00611 Clear Lacquer Electrical Spray, a fast drying, waterproof insulating component sealer (Diversified Brands, Cleveland, Ohio, available from distributors such as Grainger). Sprayon S00611 consists of a proprietary acrylic polymer in mixed organic solvents, primarily acetone, toluene, propane, and butane.

A piece (11 cm×9 cm) of Raney nickel alloy-coated foil (CERAM, Stoke-on-Trent, Great Britain) activated in accordance with the procedure in Example 5 was copper plated using the procedure described below. The activated foil had been stored under water after activation. The foil was removed from the water, patted dry with tissues, laid foil-side-up on a clean tissue, and sprayed with Sprayon S00611. The foil was then transferred to a bed of thoroughly soaked tissues in a glass beaker where it was laid down, again foil side up. The purpose of the tissues was to keep the Raney nickel side wet and protected from oxidation while the acrylic film dried on the foil.

The target copper concentration in the catalyst phase was 35% by weight with respect to the activated Raney film. $CuSO_4 \cdot 5H_2O$ (6.36 g), Versene 100 (27.6 g, 1.1 equiv. of $Na_4EDTA$) and deionized water (450 ml) were combined and added to a beaker equipped with a stir bar and containing the acrylic polymer-coated, Raney nickel foil. 2.5N NaOH (13 ml, 1.3 equiv.) was added dropwise more quickly than usual so as to be faster than any deterioration of the acrylic layer. The NaOH addition was performed over 7 minutes while stirring. The pH rose from 11.7 to 12.6. The dark blue supernatant was decanted. The back side of the foil (i.e., opposite the activated Raney side) was free of copper deposition.

The beaker was wrapped with heating tape and the decanted liquid replaced with a warm (34° C.) mixture of 50% gluconic acid (9.8 g, 1.0 equivalent with respect to copper in the first step) and water (500 ml). The pH was 2.4. Power was applied to the heating tape and stirring initiated in order to disproportionate the $Cu_2O$. The temperature reached 60° C. in ten minutes and was maintained at that level until the end of this step of the plating experiment.

Stirring was discontinued after 45 minutes. At this point, the liquid was nearly colorless, the pH was 2.3 and the temperature was 60° C. The foil was removed from the beaker, rinsed with deionized water and stored in a beaker under deionized water. There was no sign of copper plating on the back of the foil.

The next day, the water was drained and a small (approximately 1 cm×1 cm) sample cut from the foil. The foil sample was then returned to the beaker and hot (71° C.) xylenes (500 ml) added. Power was applied to the heating tape and the beaker was stirred for 30 minutes in order to remove the acrylic polymer layer. The final temperature was 105° C. The xylenes were poured off and the foil rinsed with deionized water and stored in a glass bottle under deionized water.

The catalyst side of the foil was almost black with only a few faint patches of faint copper color. This indicates that copper was not predominantly deposited on the surface of the Raney nickel film, but rather penetrated into it.

Another sample (approximately 1 cm×1 cm) was obtained and both samples were dried overnight in a vacuum oven at 120° C. under 24" Hg (610 mm Hg) vacuum with nitrogen purge.

EXAMPLE 9

Preparation of a Copper-Nickel Catalyst on a Silica Support

The plating method of this Example is similar to that in Example 2, however the copper addition in the second step of Example 2 is omitted in order to keep the pH above 2. This was done to avoid dissolution of silica. All of the copper was added in the first step, and the second step was performed at acidic pH to disproportionate copper deposited in the first step (which is thought to be predominantly in the form of $Cu_2O$) via the following reaction.

$$Cu_2O + 2H^+ + Ni^0 \rightarrow 2Cu^0 + Ni^{2+} + H_2O$$

The substrate used was 70% by weight nickel on silica, reduced and stabilized, from Acros Organics, lot A013077801. The substrate (40 g) was added to a beaker (1 liter) containing a nitrogen-sparged mixture of $CuSO_4 \cdot 5H_2O$ (33.0 g; 21 wt % Cu with respect to substrate, 30 wt % with respect to nickel), Versene 100 (145 g; 1.1 equiv. of $Na_4EDTA$, Dow via Spectrum) and water (300 ml). NaOH (58 ml; 1.1 equiv.; 2.5N) was then added dropwise over 24 minutes while stirring with an overhead stirrer under a nitrogen atmosphere. The pH rose from 11.6 to 13.4. The catalyst was filtered off and rinsed with deionized water. The filtrate was blue.

The recovered catalyst was returned to the beaker which was wrapped with heating tape. A hot solution of lactic acid (18 g; 1.5 equiv. with respect to copper added; Aldrich,) in water (300 ml) was added, power was applied to the heating tape, and the slurry was gently stirred for 50 minutes under a nitrogen atmosphere. The initial pH was 2.4 and the initial temperature was 53° C. At the end of this step, the pH had risen to 6.2, indicating that the disproportionation had occurred. The final temperature was 62° C.

The catalyst was recovered by filtration and rinsed with deionized water. The filtrate exhibited a strong nickel green color. The catalyst was dried overnight at 120° C. under 24" Hg (609 mm Hg) vacuum with nitrogen purge. Black catalyst (29.1 g) was recovered. No self-heating was observed.

EXAMPLE 10

Activity of Copper-Nickel on Silica Catalyst

The catalyst (2.5 g) of Example 9 was used to test the activity of copper-nickel silica supported catalysts using the same reforming apparatus used for activity testing in Example 7 and shown schematically in FIG. 5. A feed (of 0.1 ml/minute) of 70% ethanol and 30% water by volume was used and the temperature was varied. The catalyst was active at low temperature for the reforming of ethanol to $H_2$, CO, and $CH_4$. However, above 220° C., methanation occurred, likely catalyzed by unplated nickel.

This example also illustrates the efficacy of using Monel as a material of construction for the preheater to supress coking. A new preheater tube fabricated from Monel was used during the run. No sign of coking was seen in the preheater. The backpressure never exceeded 6 psi and was generally below 4 psi (206 mm Hg) during the run with no sign of an increase. The run was continued for 194 hours with no operational difficulty.

Product distributions, in mol % relative to ethanol supplied are provided in the Table 3, wherein the abbreviations "Acet" and "EtOH" represent acetaldehyde and ethanol, respectively. An Arrhenius plot between 185° C. and 210° C. provided an activation energy of 16.3 kcal/mol, which is identical thermodynamic enthalpy for ethanol dehydrogenation. Thus, with this catalyst loading, ethanol conversion is thermodynamically limited below about 210° C.

$$CH_3CH_2OH_{(g)} \rightarrow CH_3CHO_{(g)} + H_2 \quad \Delta H_f = +16.27 \text{ kcal/mole}$$

TABLE 3

Product Concentrations of Ethanol Reformed over a Copper-Nickel Silica Supported Catalyst

| Temp (° C.) | $H_2$ | CO | $CH_4$ | $CO_2$ | Acet | EtOH |
|---|---|---|---|---|---|---|
| 185 | 42.8% | 30.7% | 33.9% | 1.9% | 6.1% | 60.6% |
| 190 | 54.0% | 41.2% | 45.7% | 2.9% | 5.3% | 49.8% |
| 195 | 65.8% | 51.4% | 58.4% | 4.3% | 4.4% | 38.5% |
| 200 | 77.5% | 61.2% | 71.3% | 6.1% | 3.3% | 27.4% |
| 205 | 88.6% | 74.2% | 90.9% | 9.4% | 2.5% | 10.2% |
| 210 | 98.6% | 74.2% | 101.9% | 16.6% | 2.1% | 1.6% |
| 220 | 69.4% | 72.3% | 115.4% | 12.4% | 0.0% | 0.0% |
| 225 | 78.6% | 54.2% | 117.9% | 27.9% | 0.0% | 0.0% |
| 230 | 7.6% | 0.1% | 148.4% | 51.5% | 0.0% | 0.0% |

Between about 220° C. and about 230° C., methanation activity increases rapidly and by 230° C., methanation is nearly complete, with the overall stoichiometry shown by the reaction equations below. This corresponds to a shift from endothermic to exothermic chemistry. As a result, thermal instability was encountered in this temperature range. As methanation chemistry began, it tended to heat the catalyst, further increasing methanation. The temperature controller compensated by reducing heat input, but temperature correction was slow and temperature oscillations were observed.

$$CH_3CH_2OH_{(g)} \rightarrow CH_4 + CO + H_2 \quad \Delta H_f = +11.72 \text{ kcal/mole}$$

$$2CH_3CH_2OH_{(g)} \rightarrow 3CH_4 + CO_2 \quad \Delta H_f = -35.66 \text{ kcal/mole}$$

Thus, copper-nickel catalysts on silica appear to be highly active at low temperature, achieving thermodynamically-limited conversion, but are prone to methanation at higher temperatures.

EXAMPLE 11

Predicted Engine Performance Generated from Combustion Modeling

Efficiency and emissions performance of several powertrain systems were compared by combustion modeling using the "GT-POWER" simulation program. Simulated systems include internal combustion engines spark-ignited with a premixed charge and fueled by (1) gasoline, (2) hydrogen, (3) anhydrous ethanol and (4) ethanol reformate generated from contacting anhydrous ethanol with a reforming catalyst with copper at the surface of a thermally conductive metal supporting structure and without a water-gas shift. The combustion model used a one-dimensional, two zone flame speed with an equilibrium gas composition. Performance was evaluated at steady-state.

Optimized Air/Fuel Equivalency Ratio

The models were run under lean conditions as engine power can be determine from fuel flow without varying the air flow and pumping losses associated with throttling are avoided. The air:fuel equivalence ratios used for the hydrogen ($H_2$) and ethanol reformate (Ref.) engine simulations at a range of brake mean effective pressures (BMEP) are shown in Table 4 below. These lean limits were determined by increasing the air:fuel ratio in the simulation until the predicted efficiency became unfavorable or combustion parameters such as burn time, total mass fraction burned, etc., became unfavorable.

TABLE 4

Optimized lean Air/fuel Equivalence Ratios used in the Simulations

| BMEP (bar) | | | | |
|---|---|---|---|---|
| 6 | | $H_2$: 2.20 | $H_2$: 2.20 | $H_2$: 2.20 |
| | | Ref: 2.00 | Ref: 2.00 | Ref: 2.00 |
| 4 | | $H_2$: 2.86 | $H_2$: 2.86 | $H_2$: 2.86 |
| | | Ref: 2.00 | Ref: 2.00 | Ref: 2.00 |
| 2 | | $H_2$: 3.12 | $H_2$: 3.12 | $H_2$: 3.12 |
| | | Ref: 2.00 | Ref: 2.00 | Ref: 2.00 |
| 0.5 | $H_2$: 3.85 | | | |
| | Ref: 2.00 | | | |
| Engine Speed (RPM) | 850 | 1500 | 2200 | 3000 |

At low load conditions the simulated reformate engine must be operated with slight throttling. When the reformate engine is operated unthrottled at low fuel feed rates, dilution of the fuel with air is quite high. The simulation indicated that partial throttling at low fuel rates was necessary to maintain sufficiently rapid combustion.

Optimized Engine Parameters

Engine parameters used in the simulation were optimized for each system to achieve maximum efficiency while meeting $NO_x$ emissions standards (CA LEV II 50k, 0.05 g/mile, 14 ppm average over the drive cycle). First, the highest allowable compression ratio was found by increasing the compression ratio incrementally until knock was predicted. Next, the spark timing for maximum brake torque at the operating points of interest was established. The parameters were then further optimized for high efficiency and adjusted to meet $NO_x$ emissions standards based on simulated emissions results for each engine configuration except the reformate engine. In the case of the reformate engine, previous tests of lean hydrogen operation in the laboratory suggested that the air:fuel mixture will be lean enough to produce the required low levels of $NO_x$ of the CA LEV II 50 k emissions standards.

The key engine parameters used in the simulations are shown below in Table 5.

TABLE 5

Key Engine Parameters used in the Simulation

| Engine | Compression Ratio | Throttled? | Fuel/Air Mixture | Three-way Catalyst? | Boosted? |
|---|---|---|---|---|---|
| Gasoline ICE | 9 | Yes | Stoichiometric | Yes | No |
| Hydrogen ICE | 14.5 | No | Lean (See Table 4) | Not Necessary | Yes |
| Anhydrous Ethanol ICE | 14 | Yes | Stoichiometric | Yes | No |
| Anhydrous Ethanol Reformate ICE | 14 | Partial | Lean (See Table 4) | Not Necessary | Yes |

Each engine system was optimized to compare best-case scenarios for each fuel using a port fuel injected internal combustion engine. Technologies that would have given across the board improvements such as engine down-sizing were not considered. The ethanol and reformate configurations use anhydrous ethanol without a denaturant such as gasoline. In practice, a denaturant may reduce the actual compression ratios achieved.

As shown in Table 5, optimizing each simulated engine system for predicted high efficiency and predicted low $NO_x$ resulted in various system operating strategies. Gasoline and ethanol systems were simulated at stoichiometric air:fuel ratios to allow for three-way catalyst (i.e. catalytic converter) operation, while hydrogen and reformate engines were simulated lean at part load conditions to reduce pumping losses from throttling and were maintained at air:fuel ratios that rendered a three-way catalyst unnecessary to meet emissions standards. Simulated hydrogen and reformate engines were boosted to provide a better power output during lean operation. Other adjustments were made in the simulation to ensure smooth predicted engine operation, including a 25% increase in spark size for the reformate engine.

Results

Figure 6:
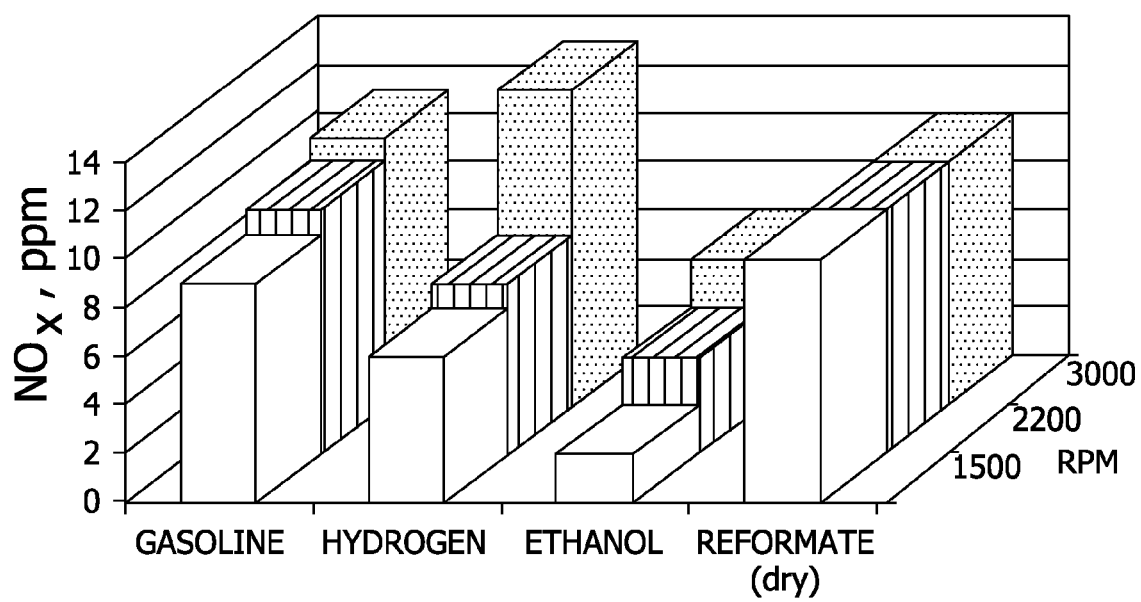
FIG. 6 is a graphical depiction of predicted $NO_x$ emissions for gasoline, hydrogen, ethanol and ethanol reformate internal combustion engine power systems at a high load condition as simulated in Example 11.

The results of the simulations are shown in FIGS. 6 and 7. FIG. 6 depicts the $NO_x$ emissions predictions of the simulation for the gasoline, hydrogen and ethanol systems. The reformate system data was generated from previously tested cases of lean hydrogen operation. As can be seen from FIG. 6 and as designed for in the simulation, $NO_x$ emissions for each configuration are maintained below CA LEV II 50 k emissions standards, i.e., below about 14 ppm. In practice, $NO_x$ emissions would be expected to be higher, perhaps by an order of magnitude, than the simulation due to the two-zone flame assumption of the simulation. The high load case where BMEP is equal to 6 bar and where emissions are the highest is shown in FIG. 6. The Figure indicates that, over a drive cycle, predicted average $NO_x$ emissions are expected to be below the limit of 14 ppm.

Predicted exhaust temperatures for the reformate system are shown in FIG. 7. Reformate engine exhaust temperature is predicted to remain high, i.e. at least about 400° C., at all conditions except idle. Accordingly, thermal contact between the exhaust gas and the reformer should be sufficient to maintain reformer operating temperatures of at least about 300° C.

Calculated peak efficiencies for the engine systems are shown in FIG. 8. As can be seen from the Figure, the anhydrous ethanol system results in predicted efficiency improvements over the gasoline system. The anhydrous ethanol reformate system further increases those benefits largely due to the 7% increase in LHV of the fuel as a result of reforming.

The design power output for each engine was assumed to be 108 kW, however the majority of drive-cycle power is less than 50 kW, with a maximum load of 6 bar and maximum speed of 6000 RPM. The efficiencies shown in FIG. 8 are best-case efficiencies. The engine will not be at peak efficiency at all points of the drive cycle. The energy required for boosting was not taken into account in the hydrogen and reformate cases however this should not result in a large efficiency drop if the engine is properly turbocharged.

In view of the above, it will be seen that the several objects of the invention are achieved and other advantageous results attained.

As various changes could be made in the above methods and constructions without departing from the scope of the invention, it is intended that all matter contained in the above description and shown in the accompanying drawings shall be interpreted as illustrative and not in a limiting sense.

When introducing elements of the present invention or the preferred embodiments(s) thereof, the articles "a", "an", "the" and "said" are intended to mean that there are one or more of the elements. The terms "comprising", "including", "containing" and "having" are intended to be inclusive and mean that there may be additional elements other than the listed elements.

What is claimed is:

1. A process for producing mechanical or electrical power, the process comprising:

contacting a feed gas mixture comprising an ethanol fuel with a reforming catalyst in a reforming reaction zone to produce a product reformate gas mixture comprising hydrogen and methane;

introducing a prechamber gas mixture comprising oxygen and ethanol fuel into a combustion prechamber in fluid communication with a combustion chamber of an internal combustion engine;

introducing an intake gas mixture comprising oxygen and product reformate gas mixture into the combustion chamber;

igniting the prechamber gas mixture in the combustion prechamber to generate a flame jet and cause combustion of the intake gas mixture introduced into the combustion chamber, thereby producing an exhaust gas effluent; and utilizing the energy of combustion for the generation of mechanical or electrical power.

2. A process for producing mechanical or electrical power in a power system comprising an internal combustion engine utilizing a four-stroke power cycle, the internal combustion engine comprising at least one combustion chamber and an intake valve in fluid communication with the combustion chamber and having an open and closed position, the internal combustion engine being capable of producing a combustion chamber expansion ratio that is greater than the corresponding compression ratio, the process comprising:

introducing an intake gas mixture comprising oxygen and a fuel selected from the group consisting of gasoline, alcohol, reformed alcohol and blends thereof into the combustion chamber of the internal combustion engine;

controlling the length of time the intake valve remains in the open position during the power cycle in response to the type of fuel introduced into the combustion chamber such that the compression ratio does not exceed about 10.5 when the fuel comprises at least about 90% by volume gasoline and is greater than about 12 when the fuel comprises greater than about 85% by volume alcohol or greater than about 10% by volume reformed alcohol;

combusting the intake gas mixture; and utilizing the energy of combustion for the generation of mechanical or electrical power.

3. The process as set forth in claim 2 wherein the length of time the intake valve remains open is controlled such that the compression ratio does not exceed about 10.5 when the fuel comprises at least about 90% by volume gasoline and is greater than about 12 when the fuel comprises greater than about 85% by volume ethanol or greater than about 10% by volume reformed ethanol.

* * * * *